United States Patent [19]
Wanie et al.

[11] Patent Number: 4,759,417
[45] Date of Patent: Jul. 26, 1988

[54] SYSTEM AND METHOD FOR CONTROLLING THE GROUND SPEED AND ENHANCING THE MANEUVERABILITY OF AN OFF-ROAD VEHICLE

[75] Inventors: Lee J. Wanie; Robert N. Behrens, both of Horicon; Stanley J. DeBraal, West Bend, all of Wis.

[73] Assignee: Deere & Company, Moline, Ill.

[21] Appl. No.: 901,716

[22] Filed: Aug. 27, 1986

[51] Int. Cl.$^4$ .................. B60K 23/00; B62D 1/00
[52] U.S. Cl. .................. 180/6.34; 180/6.36; 180/273; 180/336; 60/490; 74/474; 74/480 R; 74/512
[58] Field of Search .......... 180/6.32, 6.34, 6.36, 180/6.48, 272, 273, 305, 307, 336; 60/490, 492; 74/474, 479, 480 R, 512

[56] References Cited

U.S. PATENT DOCUMENTS

| | | | |
|---|---|---|---|
| 2,790,522 | 4/1954 | Senkowski et al. | 74/480 R |
| 3,488,955 | 1/1970 | Buelow | 60/492 |
| 3,528,311 | 10/1968 | Fieber | 74/481 |
| 3,710,904 | 1/1973 | Boyer et al. | 180/336 |
| 3,837,235 | 9/1974 | Peterson | 74/531 |
| 3,910,133 | 10/1975 | Oestmann | 74/474 X |
| 3,935,932 | 2/1976 | Moorhouse | 74/480 R |
| 4,051,915 | 10/1977 | Behrens | 180/271 |
| 4,114,738 | 9/1978 | Brown et al. | 74/474 |
| 4,129,047 | 12/1978 | Dornan | 74/474 |
| 4,215,547 | 8/1980 | Molby | 60/465 |
| 4,221,277 | 9/1980 | Mastropieri | 180/273 |
| 4,271,918 | 6/1981 | Molby | 180/6.48 |
| 4,341,129 | 7/1982 | Bando | 74/474 |
| 4,346,617 | 8/1982 | Schroeder et al. | 74/481 |
| 4,352,302 | 10/1982 | McAuliffe et al. | 74/474 |
| 4,392,543 | 7/1983 | Buckhouse et al. | 180/272 |
| 4,496,035 | 1/1985 | Wanie | 192/46 |
| 4,522,280 | 6/1985 | Blaney | 180/175 |
| 4,543,850 | 10/1985 | Bednar et al. | 74/512 |
| 4,572,310 | 2/1986 | Peter | 180/6.42 |
| 4,600,075 | 7/1986 | Heidner et al. | 180/307 X |
| 4,608,879 | 9/1986 | Ishida et al. | 74/474 |
| 4,620,575 | 11/1986 | Cuba et al. | 180/307 |

FOREIGN PATENT DOCUMENTS

| | | | |
|---|---|---|---|
| 15969 | 5/1912 | France | 180/273 |
| 156837 | 5/1978 | Netherlands | 74/474 |
| 888900 | 2/1962 | United Kingdom | 74/479 |

OTHER PUBLICATIONS

Kubota, Technical Illustration, dated Aug. 1980.

Primary Examiner—John J. Love
Assistant Examiner—Brian L. Johnson

[57] ABSTRACT

A system and method for controlling the ground speed and enhancing the maneuverability of an off-road vehicle having systems for initially establishing and thereafter automatically returning the hydrostatic transmission to the neutral position, a pedal system interconnected with the neutral location and return system for selectively driving the vehicle in either the forward or the reverse direction, a brake system consisting of a left foot operated left and right turn brake subsystem which enhances the vehicle's maneuverability, a right foot operated master brake system which is used to bring the vehicle to a complete halt and for emergencies, and a park brake system which is used to lock the brakes when the vehicle is at rest, a cruise control system which is interconnected with the pedal system and the brake system. The left foot operated turn brake subsystem enables an operator to utilize the turn brakes without the cruise control engaged and without having to take his foot off the forward or the reverse pedal. The cruise control system's interconnections with the service brake and the pedal system provide a plurality of disengagement options for the cruise control system.

58 Claims, 13 Drawing Sheets

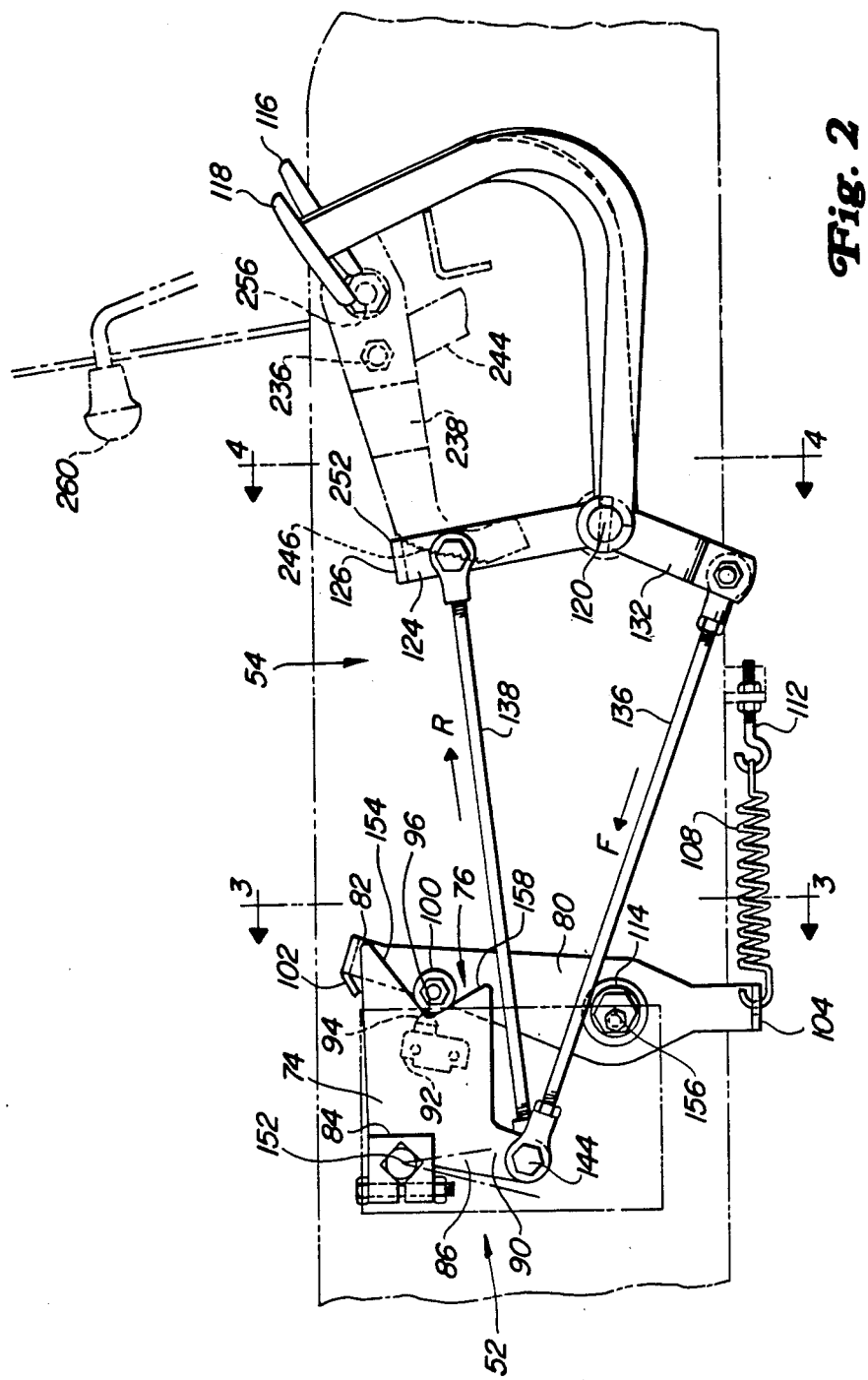

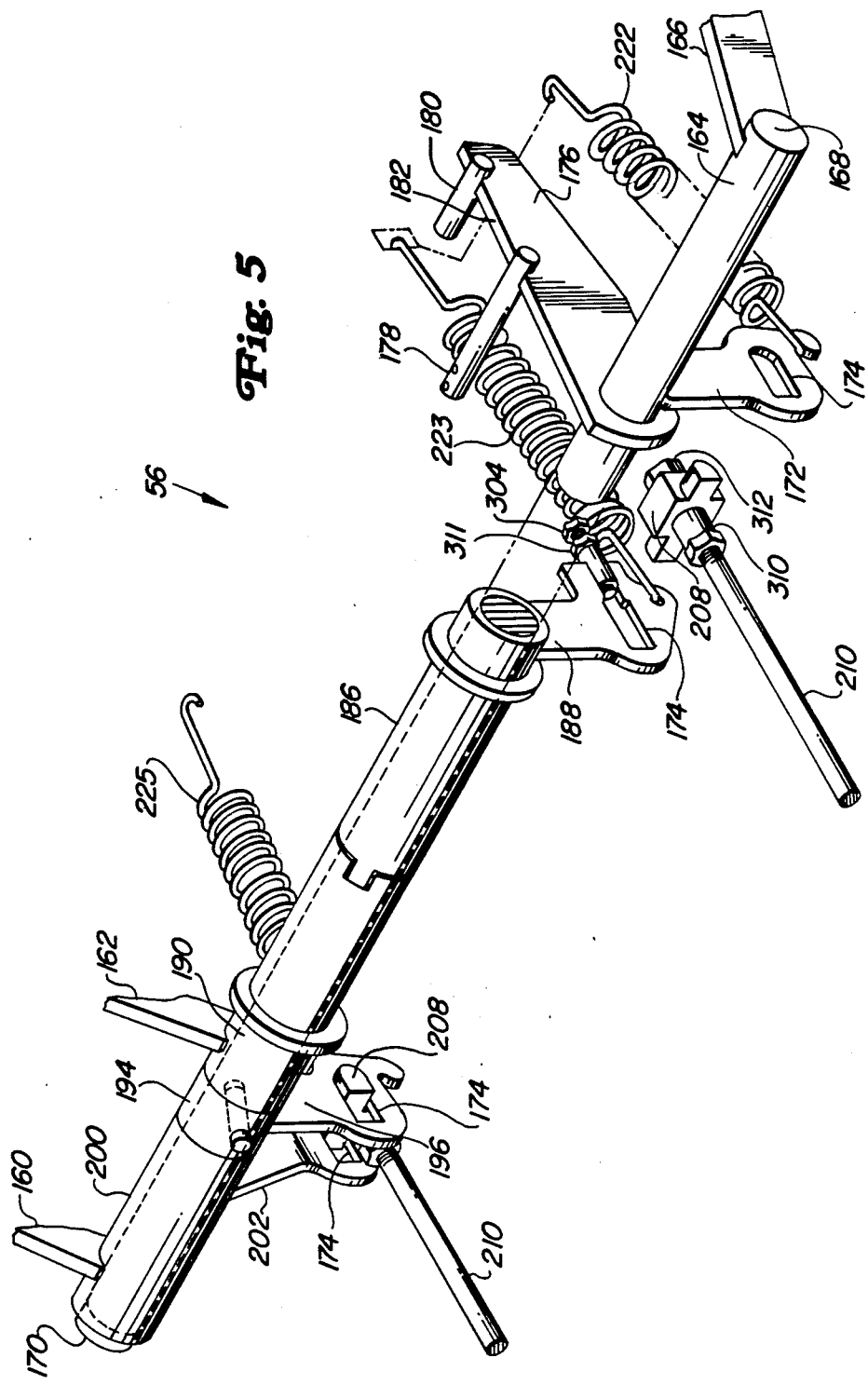

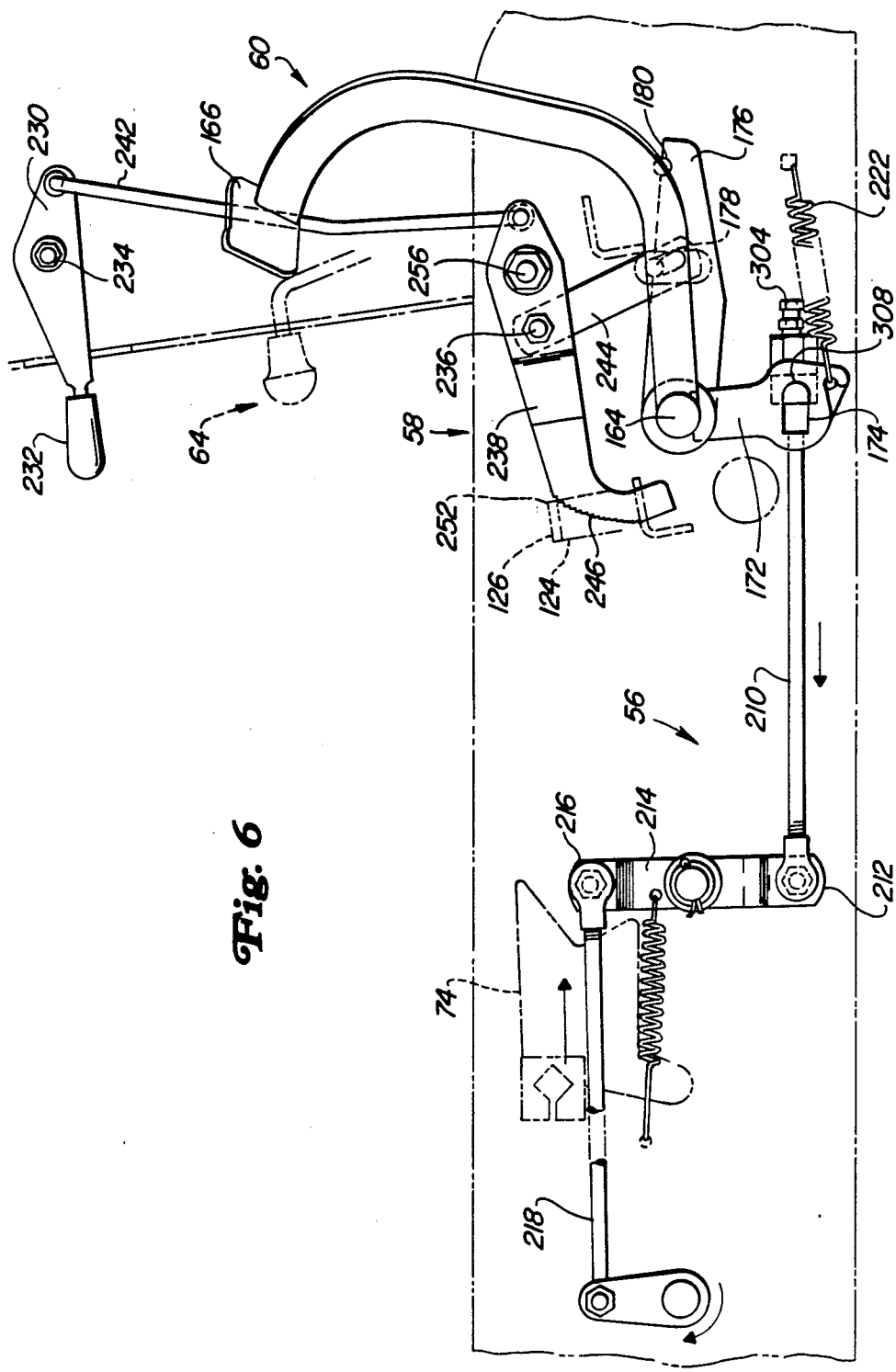

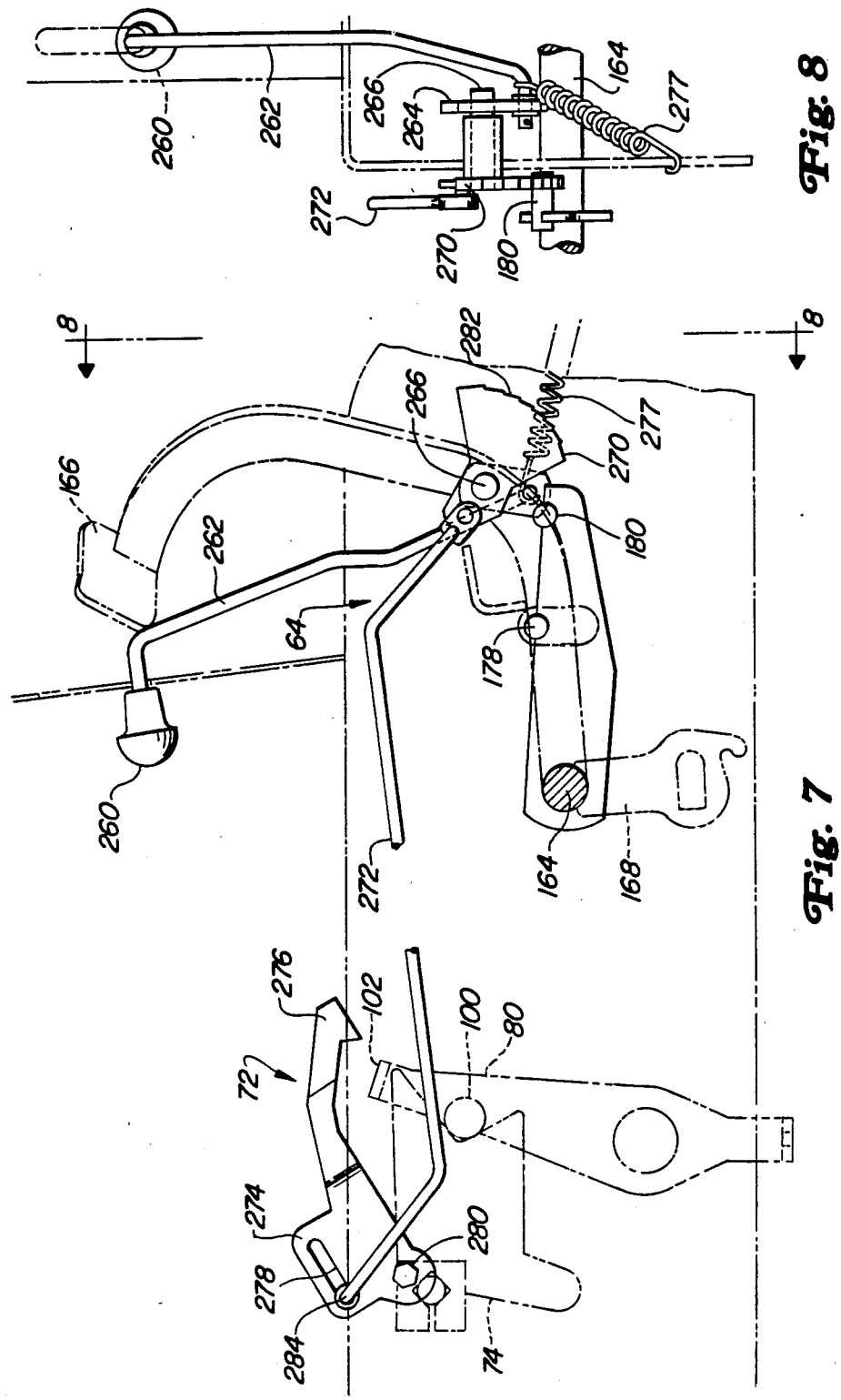

ical transmissions. U.S. Pat. No. 3,488,955 commonly owned with the

SYSTEM AND METHOD FOR CONTROLLING THE GROUND SPEED AND ENHANCING THE MANEUVERABILITY OF AN OFF-ROAD VEHICLE

BACKGROUND OF THE INVENTION

The present invention relates to a system for controlling the ground speed of a maneuverable off-road vehicle and, more specifically, relates to an interconnected system for controlling the ground speed of lawn and garden tractors and front mount mowers having hydrostatic transmissions.

It is known to provide off-road vehicles, specifically small tractors and front mount mowers with systems for controlling their ground speed. Such vehicles usually are equipped with conventional systems for: selectively operating the vehicle in either the forward or reverse direction (engine, transmission, drive train); selectively stopping the ground motion of the vehicles (brakes); and selectively utilizing the brakes to assist with vehicle's maneuverability (left and right turn brakes). It is also known to provide such vehicles with systems for: selectively maintaining a constant swash plate position without an operator engaging the accelerator or a "cruise control" and selectively disengaging the cruise control.

Additionally, it is known to be very desirable to initially precisely locate and establish the hydrostatic transmission's neutral position such that when in the neutral position, there is no ground movement or creep in either the forward or the reverse direction. Further, after initially establishing a precise neutral position, it is also desirable to either eliminate or at least reduce subsequent adjustments in order to maintain this initial precise location.

With respect to maintaining a constant swash plate position, it has long been desirable to develop not only a reliable cruise control system but one which incorporates a plurality of rapid disengagement means which, when necessary, allows an operator to rapidly disengage the cruise control system in order to regain normal control of the vehicle.

Another previously unrealized goal of designers in the art relates to means for preventing the vehicle from being driven with the parking brake partially engaged or for preventing the operator from accidentally depressing a forward or reverse control pedal such as when mounting the vehicle thereby causing the vehicle to accelerate in either the forward or reverse direction. The absence of means for preventing these conditions results in constant potential unsafe conditions. Additionally, without means for positively preventing the vehicle from being driven with the parking brake partially engaged, potential for causing excessive wear of the brake system is greatly enhanced.

Solutions to a number of these problems have been proposed. Specifically, it is well known to provide a throttle and a gear selector attached to the engine, transmission and drive train for selectively operating the vehicle in either the forward or reverse directions. It is also well known to provide a system for selectively stopping the vehicle when operating in the forward and reverse directions. It is further well known to provide foot brakes to assist with vehicle maneuverablity.

With respect to methods and apparatus for precisely locating the neutral position of a hydrostatic transmission, U.S. Pat. No. 3,488,955 commonly owned with the present application, illustrates one attempt to solve this problem. While the mechanical linkage disclosed did improve the initial location and subsequent return of the swash plate to the hydro neutral position, the tolerances between the cam roller and the groove, which increase, due to wear, with usage, did not satisfactorily reduce creep since due to these tolerances and subsequent wear, there was some movement of the swash plate. Since it is important that there be no movement of the swash plate when the transmission is in the neutral position and since creep can be caused by as little as one half of a degree or even less movement, the disclosed mechanical linkage proved somewhat inadequate over time.

Another problem with the linkage disclosed in the U.S. Pat. No. 3,488,955 involved the incorporation of a neutral start switch. Since there was quite a long linkage which ran from the operators location all the way back to the transmission, it was possible for the gear lever to indicate that the transmission was in the neutral position when the transmission swash plate was not in the netural position, thus, the netural start switch was not in the proper position and the vehicle would not start.

With regard to cruise control systems for off-road vehicles having hydrostatic transmissions, previously known systems have proven somewhat unreliable and have not incorporated at least three methods for positively effectuating cruise control disengagement.

A typical cruise control system utilizes a friction device to maintain the position of the swash plate. These friction devices present problems, since the tendancy of all hydrostatic transmissions under load, such as going up a hill, is to seek the neutral position, the friction contact is often prematurely broken resulting in the vehicle slowing down. This naturally requires that the operator place the vehicle back in the cruise mode by reengaging the friction device. Obviously any friction device will, over time, suffer from wear. Thus, the cruise controls containing friction devices require frequent replacement.

Accordingly, there is a need for an improved system and method for controlling the ground speed of a maneuverable off-road vehicle having a hydrostatic transmission which provides an operator with precise control of the vehicle. Such a system should have a precisely located neutral position; a foot controlled system for operating the vehicle in both the forward and reverse directions; a system for stopping the vehicle or brake system which includes: a left and right turn brake system for enhancing the vehicles maneuverability; a service brake system for emergency, rapid stopping and a park brake system; a system for selectively maintaining a constant swash plate position when the vehicle is being operated in the forward direction only or "cruise control" system; at least three positive, separate means for disengaging the cruise control and a system for interconnecting the cruise control system, the foot controlled operating system and the brake system.

SUMMARY OF THE INVENTION

The present invention provides an improved system and method for obtaining and maintaining control of the ground speed of and for enhancing the maneuverability of a maneuverable off-road vehicle.

In the preferred embodiments, the system of the present invention is illustrated utilizing both a compact utility tractor and a front mount mower, each having a hydrostatic transmission and an operator seat. The system of the present invention includes: an engine operatively connected to a hydrostatic transmission; a foot pedal system, operatively connected to the hydrostatic transmission, for selectively engaging the transmission such that the vehicle is operated in either the forward or the reverse direction; a brake system, operatively connected to the vehicle, for selectively stopping the ground speed of the vehicle and for selectively slowing the vehicle's left wheel or right wheel ground speed respectively thereby enhancing the vehicle's maneuverability; a neutral position location and return system, operatively connected to the hydrostatic transmission swash plate and the foot pedal system, for precisely locating the hydrostatic transmission's neutral position and for automatically returning the transmission to the neutral position; a cruise control system, operatively connected to the transmission, the pedal system, and the brake system, for selectively maintaining the swash plate at a constant position when the vehicle is moving in the forward direction only and at least three separate methods, operatively connected to the cruise control system, for selectively disengaging, when necessary, the cruise control system.

A further aspect of the present invention includes a system, operatively connected to the brake system, for preventing the off-road vehicle from being operated with the parking brake partially engaged and for preventing the accidental acceleration of the vehicle by inadvertent engagement of the forward or reverse control pedals when mounting the vehicle or otherwise.

Accordingly, it is an object of the present invention to provide an improved system and method for controlling the ground speed of a maneuverable off-road vehicle; to provide an improved system and method for interconnecting the forward and reverse direction pedal control system, the service brake system and the left and right turn brake system; to provide an improved system and method for precisely locating the neutral position of the hydrostatic transmission; to provide an improved system and method for automatically returning the hydrostatic transmission to the initially located neutral position; to provide an improved cruise control system operative only when the vehicle is operating in the forward direction; to provide an improved system and a plurality of methods for selectively disengaging, when necessary, the cruise control system; to provide an improved system and method for preventing the accidental ground motion of the vehicle when stopped unless the operators seat is in the occupied position; and to provide an improved system and method for preventing vehicle operation when the parking brake is only partially engaged.

Other objects and advantages of the invention will be apparent from the following description, the accompanying drawings and the appended claims.

BRIEF DESCRIPTION OF THE DRAWINGS

FIG. 2 is a partial side view illustrating the interconnection of the neutral location and return system and the pedal system of the compact utility tractor of FIG. 1;

FIG. 5 is a partial isometric view of the brake system of FIG. 1;

FIG. 6 is a partial side view of the brake system of FIG. 1;

FIG. 7 is a parital side view of the parking brake system of FIG. 1;

FIG. 8 is a view taken along line 8—8 of FIG. 7;

DESCRIPTION OF THE PREFERRED EMBODIMENT

Figure 1:
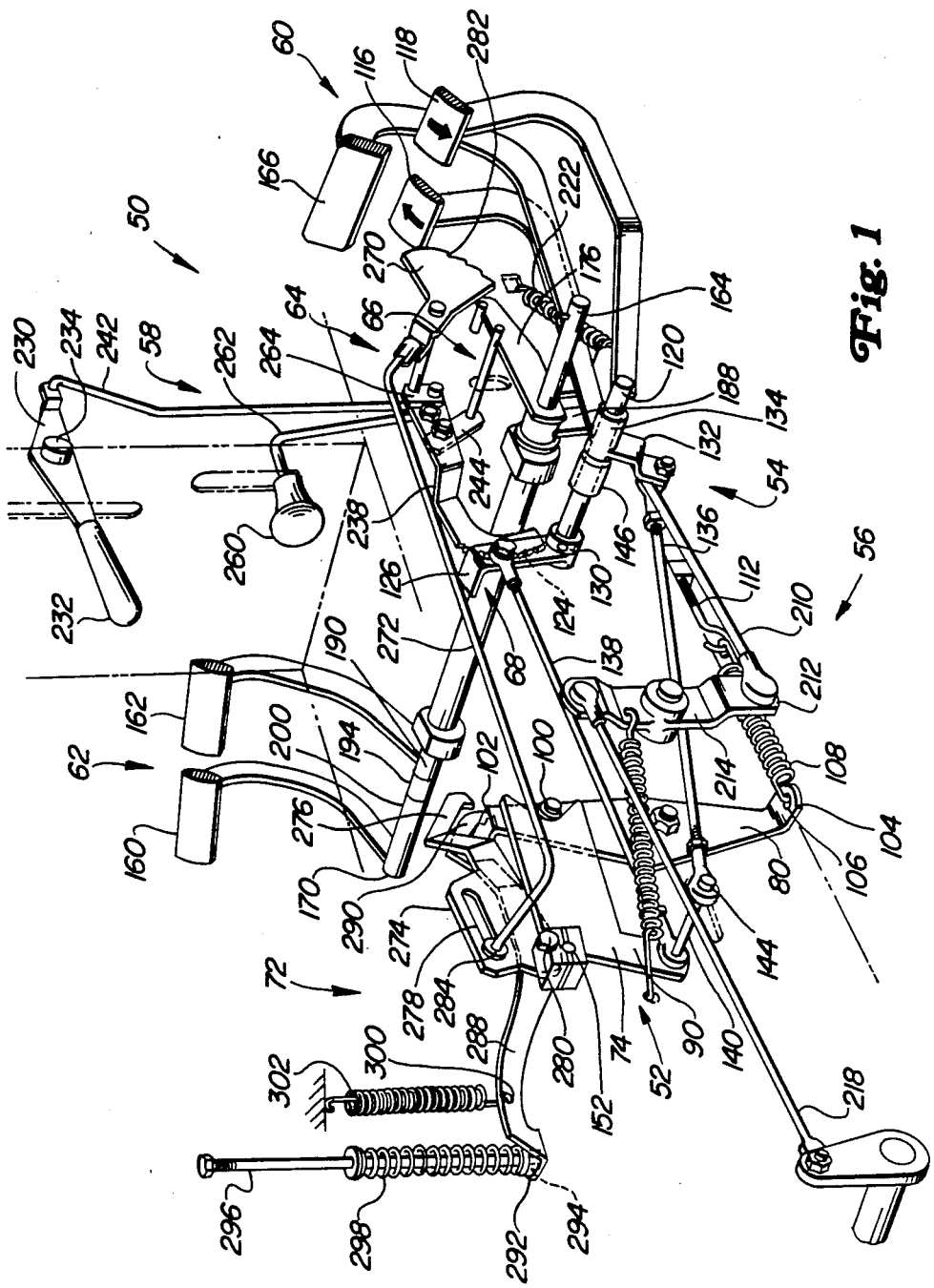
FIG. 1 is a partial isometric view of a compact utility tractor incorporating the improved ground speed control system and method of the present invention.
Figure 4:
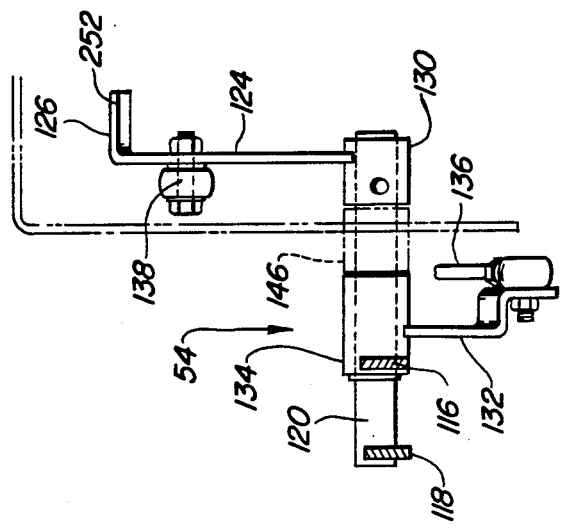
FIG. 4 is an isolated partial view taken along line 4—4 of FIG. 2.

The ground speed control system for a small compact utility tractor, generally designated as 50, of the present invention is illustrated in FIGS. 1-8. The ground speed control system includes the following subsystems: a system 52 for precisely establishing an accurate hydrostatic transmission neutral position and for automatically returning the hydrostatic transmission to the neutral position; a forward and reverse direction foot pedal system 54; an interconnected brake system 56 consisting of: a cruise control system 58, a service brake system 60, a left and a right turn brake system 62, and a parking brake system 64; a system for interconnecting the cruise control system to the service brake system; a system 68 for interconnecting the cruise control to the forward foot pedal; and a seat brake system 72 for positively preventing ground movement of the compact utility tractor by the accidental engagement of the forward or reverse pedals when the operators seat is unoccupied.

Figure 3:
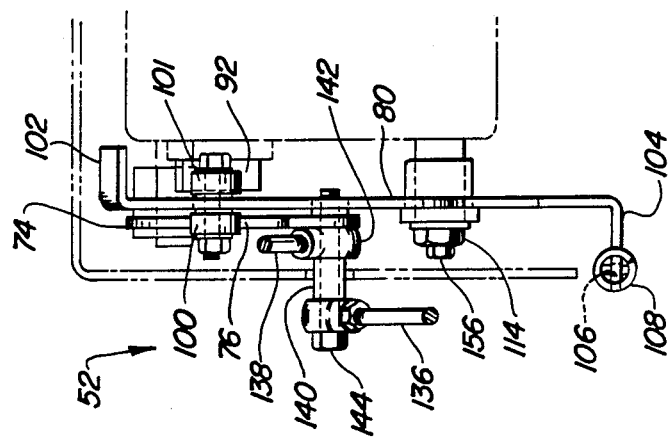
FIG. 3 is an isolated partial view taken along line 3—3 of FIG. 2.
Figure 9:
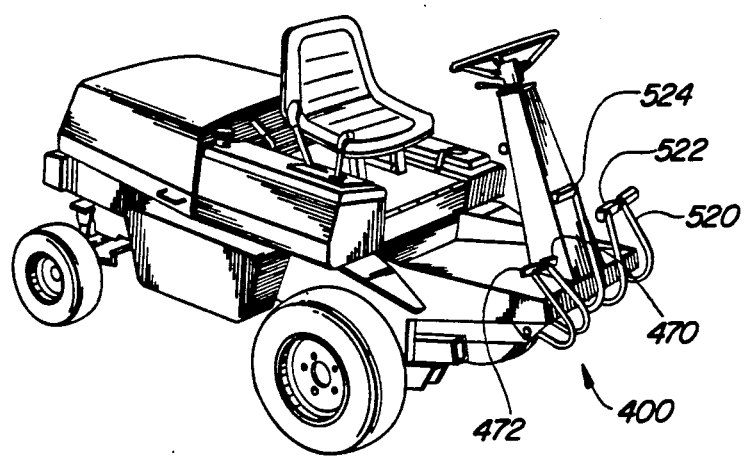
FIG. 9 is an isometric view of a front mount mower incorporating the improved ground control speed system and method of the present invention.

As shown in FIGS. 1-3 the neutral position location and return system 52 consists of linkage designed to control the swash plate shaft of the hydrostatic pump (not shown). The reversible hydrostatic pump (variable speed) is driven by the vehicle engine (not shown) which in turn drives a hydrostatic motor (fixed displacement). The hydrostatic motor drives a gear driven differential (not shown). The differential drive axles (not shown) are connected to drive wheels (not shown). In operation, the engine RPM is constant. Forward or reverse ground speed is varied by rotation of the pump swash plate shaft to the appropriate side of the neutral position.

Since initial neutral position location and the ability to automatically return thereto are essential to the operation of any vehicle having a hydrostatic transmission, the system for precisely locating and establishing the hydro neutral position and the system for precisely returning to the hydro neutral position from either forward or reverse will be discussed first. One embodiment of the hydro neutral position system consists of a cam 74 having a V portion 76 connected to the transmission swash plate (not shown) and a cam follower 80 pivotally connected to the transmission.

The cam 74 is generally rectangular having a V portion 76 formed on a first end 82, a cut out portion 84 formed on the upper portion of second end 86 about which the cam pivots and a connection extension 90 formed on the lower portion of the second end 86. A conventional electrical switch 92 having a plunger 94 positioned proximate to the apex of the V is attached to one side of the cam having its plunger 94 positioned in the apex of the V.

The cam follower 80 has two rollers 100, 101 rotatably connected to each side thereof and two flanges 102, 104, extending in opposite directions at approximately ninety degrees to the cam follower, at each end thereof. The lower flange 104 has an aperture 106 for connecting a spring 108 to the vehicle frame by an adjustable eyebolt 112. The cam follower 80 is pivotally connected to the transmission by a conventional eccentric 114 which is utilized to optimally adjust the swash plate attached to the cam 74 to the hydro neutral position.

As described above, the cam 74 is connected to the swash plate at pivot point 152. The roller 100 is attached to the cam follower which engages the cam V, moves along either leg of the V depending on which way the cam is rotated. Cam rotation causes the roller to move from the V apex which in turn causes the cam follower to rotate about the eccentric. This rotation stretches the spring 108. Upon the release of the rotation from the cam, the spring 108 will bias the lower cam follower flange 104 clockwise moving the roller 100 on into the apex of the cam V.

As shown in FIG. 2 the neutral start switch 92 is connected to the cam and positioned in transverse alignment with the cam V apex. The switch 92 has a conventional plunger 94 which, in order for the vehicle to start, must be depressed by the second roller 101 on the inside portion of the cam follower 80.

With this particular arrangement, precise location of the neutral position is facilitated. Specifically, since the neutral start switch 92 is positioned on the cam 74 such that the inside cam roller depresses it only when the rollers are positioned in the apex of the V and since the swash plate and cam are adjusted so that the apex of the V and the cam roller is positioned in the apex of the V only when the transmission is in the neutral position, the V profile combined with the rollers and switch provide for exact initial neutral position location. Thus, once located, due to the closeness of the neutral start switch 92 to the actual swash plate, deviation from the hydroneutral position is, if any, extremely minimal.

As shown in FIGS. 1-4 the forward and reverse pedal system 54 is interconnected to the neutral location and return system 52. The pedal system 54 is utilized to rotate the cam 74 and the swash plate connected thereto. The neutral return system automatically returns the hydrostatic transmission to neutral rapidly, but smoothly upon disengagement of either the forward 116 or the reverse 118 pedals.

The forward and reverse pedal system consists of a forward (left) 116 and a reverse (right) 118 pedal operatively connected to a shaft 120. The reverse pedal 118 is connected to one end of the shaft 120 and a reverse arm 124, with a flange 126 at one end and a hub 130 at its other end, is conventionally attached to the other shaft end. The attached arm 124 extends above the shaft 120. The forward foot pedal 116 is connected to a pedal bushing 134 (FIG. 4) rotatably mounted on the shaft 120. The bushing 134 has a forward arm 132 connected thereto and extending below shaft 120.

Forward and reverse connecting rods 136, 138 are pivotably connected to the forward 132 and reverse 124 pedal arms, respectively, at one end and are both connected at their respective other ends to a bolt 144 connected by a spacer 140 to the cam extension portion 90. Since the forward pedal 116 is connected to the bushing 134 which is rotatably mounted on the shaft 120, the key to the operation of the pedal system 54 is that the forward connecting rod 136 is located below the shaft 120 and the reverse connecting rod 138 is located above the shaft 120 and both rods are connected to the cam below the cam pivot point 152. Thus, when different pedals are depressed, the cam 74 is rotated in opposite directions.

In order to drive the vehicle in either the forward or reverse directions, an operator would depress either the forward or the reverse pedals. If the operator were to depress the forward pedal, which is rotatably connected to the shaft 120, the lower arm 132 would rotate clockwise which would compress the forward connecting rod 136 to the rear which in turn would rotate the cam 74 about the cam pivot point 152 connection clockwise. The roller 100 in the cam follower 80 moves along the upper surface 154 of the cam V 76 causing the cam follower 80 to rotate clockwise about its pivot 156.

As the forward pedal 116 is depressed, the reverse pedal 118 is rotated an equal distance in the opposite direction. If the operator were to remove his foot from the forward pedal, the spring 108 achored to the frame by the adjustable eyebolt 112 would tend to pull the upper flange 102 of the cam follower 80 counterclockwise causing the roller 100 to seek the apex 96 of the cam V 76, thus, automatically returning the hydrostatic swash plate to the neutral position and the pedals 116, 118 to the rest postion.

In order to propel the vehicle in the reverse direction, an operator would depress the reverse pedal 118 rotating the shaft arm 124 connected to the reverse connection rod 138 clockwise which would then rotate the cam 74 counterclockwise about its pivot point 152 causing the cam follower roller 100 to move along the lower cam V surface 158 which would also cause the cam follower 80 to rotate clockwise.

Thus, it can be seen that the forward and reverse pedals operate in tandem i.e. that displacement of one or the other in a direction is met by equal displacement of the other in the opposite direction. The adjustable eyebolt 112 and spring 108 connected to the cam follower 80 provides constant tension on the cam follower 80 such that upon the absence of pressure being applied on either pedal 116, 118, the cam follower 80 is rotated in a counterclockwise direction forcing the roller 100 attached to the cam follower 80 to seek the apex 96 of the cam V 76 thus, automatically returning the cam to the neutral position.

It should be pointed out that one surface of the cam V is approximately twice as long as the opposing surface. Since it is desirable to drive the illustrated vehicle faster in forward than in reverse, the forward portion of the V surface has twice the surface length of the reverse surface 158. The relative cam V surface lengths could be designed to accomplish any desirable relative speed relationship between forward and reverse within the limits of a particular hydrostatic transmission.

The interconnected brake system 56 consisting of the left and right turn brake subsystem 62, the service brake subsystem 60 and the parking brake subsystem 64 is shown in FIGS. 1, 5-8.

The turn brake subsystem 62 consists of left foot operated outboard 160 and inboard 162 pedals. When applied, the outboard pedal 160 assists with left turns and the inboard pedal 162 with right turns. The service brake subsystem 60 is right foot operated and simultaneously applies both the left and right turn brakes.

The service brake pedal and the two turn brake pedals are assembled to the frame of the tractor utilizing a series of components which, when assembled, provides a unique system for allowing the individual turn brakes to be applied without the operator removing his foot from the forward or reverse pedals.

Specifically, as shown in FIG. 5, the brake system 56 consists of a shaft 164 which runs the entire width of the frame. The shaft 164 has the service brake pedal 166 connected thereto at one end 168 and an aperture (not shown) for receiving a cotter pin at the other end 170. An arm 172 having an elongated slot 174 formed therein is connected to the brake shaft 164 proximate the service brake pedal 166 connection. A second arm 176 having a pair of studs 178, 180 connected to the top surface 182 thereof, is also connected to the brake shaft 164 in near proximity to the first arm 172. A bushing 186 having a third arm 188 with an elongated slot 174 formed therein is conventionally assembled on the shaft 164. This bushing 186 extends to approximately the center of the shaft 164 where it is conventionally connected to a similar bushing portion 190 extending through the left frame member.

The right turn pedal 162 is connected to the second bushing 190. Immediately next to the right turn pedal bushing 190, a third bushing 194, having an fourth arm 196 with an elongated slot 174 is conventionally connected to the shaft 164 such that the bushing 194 and attached arm 196 will rotate when the shaft 164 rotates.

The final portion assembled over the shaft 164 is a bushing 200 having the left turn brake pedal 160 and a fifth arm 202 having an elongated slot 174 formed therein connected thereto. These components are conventionally secured to the shaft and rotate independently of the shaft.

As shown in FIGS. 5 and 6, the four arms 172, 188, 196 and 202 each having one of the elongated slots 174, form a pair of arms on each side of the brake system shaft. The pairs of arms (172, 188), (196, 202) are respectively connected by separate linkage systems to separate brake drums (not shown). Specifically, a pair of members 208 are respectively positioned in the elongated slots of the two pair of arms (172, 188), (196, 202). Each member 208 is connected by a rod 210 to the lower end 212 of a bell crank 214 pivotally mounted to the vehicle. The upper end 216 of the bell crank 214 is further connected by a rod 218 to a respective brake (not shown). The brake arms 172, 188, 196, 202 are each biased toward the front end of the vehicle by springs 222, 223 and 225 connected to the lower end of each arm.

At this point, it should be pointed out that while the right brake system has been illustrated in detail, a mirror image of the system shown in FIGS. 1 and 6 is attached to the arms 196, 202 by another member 208 having identical components attached to the left brake.

With this arrangement, it is possible for an operator to utilize his left and right turn brakes without having to remove his foot from the forward or reverse pedal, as stated earlier. Without this particular arrangement, previously the operator had been required to remove his foot from the pedal in order to operate the turn brakes thereby losing considerable speed unless the vehicle were equiped with a cruise control.

If the operator depresses the left turn brake pedal 160, the outer hub 200, would rotate clockwise about the brake shaft 164 causing the fifth arm 202 to rotate toward the rear of the vehicle placing the lower brake rod 210 in compression, rotating the left bell crank clockwise which would pull the upper brake rod 218 thereby rotating the brake arm and applying the left wheel brake. None of the other four arms 172, 176, 188 or 196 are effected because the shaft 164 has not been rotated.

If the operator depresses the right turn brake 162, since that turn brake is connected to arm 188 through the two bushings 190, 186, the right brake rod 210 connected thereto is placed in compression, which rotates the right bell crank 214 clockwise thereby pulling right rod 218 and applying the right wheel brake.

In order to stop the vehicle quickly, the service brake pedal 166, which is positioned above and between the forward 116 and reverse 118 pedals on the right hand side of the vehicle, is depressed. Upon depressing the service brake pedal 166, the brake shaft 164 is rotated clockwise which in turn rotates the first arm 172, the second arm 176 having the two studs 178, 180 attached, and the fourth arm 196 on the left side which is connected to the brake shaft 164. Rotation of arms 172, 196 engages each member 208 placing the respective connecting rods 210 in compression rotating the respective bell cranks 214 clockwise thereby simultaneously applying both brakes.

Due to the elongated slots 174 (lost motion slots) in each of the four arms 172, 188, 196 and 202, application of one turn brake will not necessarily apply the other brake. The elongated slots in the four brake arms function as lost motion systems. The key to achieving independent turn brake control is the arm lost motion slots 174 and the connection member assembled therein. One arm selectively moves the member 208 mounted between the two slots on each side. The member 208 does not move any of the arms 172, 188, 196, 202.

As illustrated in FIG. 6, the cruise control system 58 is hand operated with the control lever 230 being located below the steering wheel (not shown). The cruise control can only be engaged when the vehicle is moving in the forward direction. To engage the cruise control system, upward lever rotation is required. Cruise control disengagement can be accomplished in three ways: (1) by downward rotation of the lever 230, (2) further depressing the forward foot pedal 116 and (3) depressing on the service brake pedal 166.

As illustrated, the cruise control system 58 is a mechanical system which utilizes a ratchet and pawl device for positive swash plate position retention. A knob 232 is attached to the lever 230 which is pivotally mounted to the vehicle at 234. The lever 230 is connected to one end of a latch cruise control 238 by a link 242. The latch cruise control 238 is connected to one end of a strap 244. The other end of the strap 244 is connected to stud 178. Ratchet teeth 246 for engaging the flange 126 acting as a pawl are provided on the other end of the latch cruise control 238.

As previously stated with reference to FIG. 1, when the forward pedal 116 is depressed, the arm 124 and flange 126 are rotated counterclockwise away from the teeth 246 thus creating a space between the forward edge of the flange 126 and the teeth 246 on the latch cruise control 238.

To engage the ratchet teeth 246 with the pawl flange 126, the knob 232 is pulled upward pivoting the lever 230 about pivot point 234. The link 242 connected to the far end of the lever is compressed between the lever 230 and the latch cruise control 238. In response to this compression, the latch cruise control 238 pivots about the pivot point 256 established by the connection of the latch cruise control 238 to the vehicle. The latch cruise control is rotated about the pivot 256 thereby rotating the ratchet teeth 246 upward relative to flange 126 until one of the teeth engages the flange.

At this point, the cruise control is firmly engaged and an operator may then release pressure from the forward foot pedal 116 and the vehicle will continue to operate with the cam attached to the swash plate locked in a specific position. The latch cruise control 238 is designed to allow for engagement between the flange 126 and the ratchet teeth 246 such that minimum to maximum swash plate deflection is provided thereby.

If the vehicle were driven in reverse, the flange 136 would be rotated clockwise over the upward arc of the latch cruise control 238 thereby preventing the teeth 246 from engaging the forward edge 252 of the flange pawl 126. Since the cam 74 is biased toward the neutral position by the spring 108 adjustably attached to the cam follower 80 and the frame, the flange 126 is biased toward the latch cruise control 238 thereby providing the pressure necessary to maintain flange engagement with the teeth.

Since one of the features of the present invention is to provide a plurality of methods for disengaging the cruise control once engaged, the three disengagement methods will now be discussed. To disengage the cruise control system, an operator need only exert pressure down on the cruise control knob 232 which would then pull the connecting link upwardly moving the end of the latch cruise control connected to the rod 242 also upward toward the lever 230 causing the latch cruise control 235 to pivot about the pivot point 256 which would then rotate the teeth counterclockwise down and away from engagement with the flange.

A second method of disengaging the cruise control is by further depressing the forward control pedal 116. If the forward foot control is depressed further, the flange 126 connected to the arm 124 is further rotated counterclockwise away from engagement with the teeth 246 and the latch cruise control 238 then falls by gravity from engagement with the flange 126 pawl.

A third method of disengaging the cruise control system is by depressing the service brake pedal 166. By depressing the service brake pedal 166, the arm 176 having the long stud 178 connected thereto is rotated clockwise. The stud 178, which is connected to a slot in the strap 244, pulls the ratchet teeth 246 out of engagement with the flange 126 pawl.

One important feature of the ratchet and pawl cruise control system and the location of the turning brakes is that an operator cn utilize the turning brakes without having the cruise control engaged. Additionally, with the cruise control engaged the operator can use the turning assist brake without disengaging the cruise control.

Another important feature of the cruise control of the present invention is to ensure that all ratchet teeth are utilized. This is accomplished by means of a conventional eccentric 256 which enables the latch cruise control 238 to be precisely located relative to flange 126. The eccentric 256 provides relative motion for moving the latch cruise control 238 up or down in order to set the latch cruise control 238 such that the very first ratchet tooth will be engaged by the flange pawl for minimum swash plate deflection and such that the very last ratchet tooth will be engaged by the pawl for maximum swash plate deflection.

As shown in FIGS. 7 and 8, the parking brake system 64 consists of a knob 260 and link 262 connected to a strap 264 and a stud 266 which is connected to a cam 270. A second rod 272 has one end connected to the cam 270 and its other end connection to hydrolock arm 274 having a hook member 276 for engaging the upper flange 102 of the cam follower 80. The second rod 272 is connected to an elongated slot 278 in the arm 274. The arm 274 is connected to the vehicle by a bolt 280 (see FIG. 1).

To engage the parking brake, an operator depresses the service brake pedal 166 which rotates the brake shaft 164 having first arm 172, second arm 176, and fourth arm 196 attached thereto, clockwise lowering the second stud 180 attached at the far end of the second arm 176. The operator simultaneously raises the knob 260 of the parking brake which rotates the cam 270 having teeth 282 formed therein on one surface until it engages the stud 180. This rotation pulls rod 272 toward the front of the vehicle which in turn slides the rods connection 284 to the arm 274 toward the front of tractor which subsequently allows the hook member 276 to move clockwise by force of gravity latching the hook 276 over the upper flange 102 of the cam follower 80.

When the parking brake is engaged, the brake shaft 164 is locked in place by the cam 270. The first arm 172 and the fourth arm 196 are both rotated clockwise, compressing both lower brake connecting rods 210, rotating the bell cranks 214 clockwise, pulling the upper brake connecting rod 218 so that both the left and right brakes are engaged. Additionally, with the cam 270 locked in position, the hook member 276 of the arm 270 positively prevents rotation of the cam follower 80 and hence the cam 96 so that if an operator should attempt to depress the forward or the reverse pedals with the engine running, movement of the vehicle would not occur due to the inability of the hydrostatic transmission to move from the neutral position.

To disengage the parking brake, the service brake is depressed, releasing contact between the stud 180 and the cam 270. Once this contact is broken, the spring biased cam 270 is rotated counterclockwise out of contact with the stud 180.

The cam 270 is designed such that when locked by stud 180, the cam tends to maintain engagement therewith unless that contact is deliberately broken by depressing the service brake pedal.

The seat brake system illustrated in FIGS. 1 and 7 is an additional safety system which operates for preventing vehicle movement as might be caused by accidentally engaging or depressing either the forward or reverse pedal system 54. The seat brake system 72 consists of an elongated hydrolock arm or lever 288 having a hook 290 at one end for securing the upper flange 102 of the cam follower 80 and having a flange 292 having an aperture 294 formed therein at the other end thereof. The flange aperture receives a rod 296 having a spring 298 mounted thereon. The lever 288 is pivotably connected to the vehicle by the bolt 280. An aperture 300 for receiving a second spring 302 is positioned near the flange end of the lever.

The spring 302 tends to rotate the flange portion upwardly about the bolt 280 and therefore tends to engage the hook 290 over the upper flange 102 of the cam follower 80. Spring 298 acts as a cushion to absorb the pressure from the operators seat when traversing rough terrain such that the lever 288 is not deformed.

In order to release the hook 290 from engagement with the cam follower flange 102, it is necessary that pressure be applied to the upper end of rod 296 such as that provided by an operator sitting in the operator's seat. This pressure will shift the rod 296 against the spring 298, rotating lever 288 counterclockwise about pivot 280, thereby raising hook 290 from engagement with cam follower flange 102.

This system provides a positive system for preventing the forward 116 or reverse 118 pedals from being inadvertently engaged with the engine running and the operator not occupying the seat thereby preventing movement which might lead to possible injury.

In order to interconnect the hydrostatic transmission with the foot pedal system 54, the cruise control system 58, the hydro-lock arms 274, 288 and the brake system 56, while positively locating the hydro-neutral position, it is necessary to make the following adjustments.

To adjust the hydrostatic transmission, first disengage the front wheel drive (if so equipped) and raise both rear wheels off the ground. Next, start the tractor engine and observe rear wheel rotation. Finally, loosen the cap screw in the eccentric 114 positioning the cam follower 80 and rotate the eccentric clockwise or counterclockwise until the wheels stop turning. At this point, the eccentric should be set half way between the position where the wheels rotate in one direction or the other. Finally, tighten the cap screw and stop the engine.

Since the eccentric 114 can be set in two positions and the wheels will still stop, the eccentric must be set so that its offset faces to the rear of the tractor thereby allowing the hydro-lock arms 274, 288 to latch over the cam follower 80.

To adjust and coordinate the forward 116 and reverse 118 pedals with the cruise control system 58, the forward pedal 116 is adjusted by, loosening the two lock nuts on the outside directional control rod 136 and turn that control rod out until the bottom of the pedal is seven to ten millimeters above the surface of the foot rest when the pedal 116 is fully depressed. Once this position is obtained, tighten the lock nuts.

To set the reverse pedal 118 and cruise control system 58 in proper adjustment, with the hydrostatic transmission in neutral and the latch cruise control 238 in the up position, the first or top front tooth in the latch cruise control 238 will contact and engage the speed control reverse arm flange 126. Next, loosen the two lock nuts on the inside directional control rod 138 and rotate the rod in or out until the latch cruise control 238 engages the reverse arm flange 126 as stated above. Once this is accomplished, tighten the lock nuts on the control rod 138. Next, with the parking brake released, fully depress the reverse pedal 118. In this position, reverse arm flange 126 must pass over the top of the latch cruise control 238 with one to three millimeters clearance. To make this adjustment, loosen the cap screw in the adjuster or eccentric 256 positioned in the latch cruise control 238 and rotate the eccentric 256 clockwise or counterclockwise until the one to three millimeter dimension is obtained. Once this dimension is obtained, tighten the cap screw.

Since the eccentric 256 can be set in two positions, it must be set so that the distance between that hex on the eccentric 256 and the capscrew which mounts the latch cruise control 238 is at the greatest distance.

In order to perform a functional check of the cruise control, the following steps should be taken. The forward pedal 116 must be able to be set in any position by depressing the pedal and lifting cruise control knob 232 in the pedestal. Additionally, the forward pedal 116 must release and return to neutral from any set cruise position by any of the following means: (1) depressing the service brake pedal 166; (2) pushing down on the cruise control knob 232 in the pedestal; and (3) slightly depressing forward pedal 116 and then removing pressure from the pedal.

In order to insure that the hydro-lock arms 274, 288 are positioned properly, the following adjustments are necessary. First, loosen the hydro-lock pivot bolt 280. With both hydrolock hooks 276, 290 latched over the cam follower flange 102, slide both arms to the rear of the slot 278 as far as possible so that the hooks 276, 290 are tight against the cam follower flange 102. At this point, tighten the bolt 280.

It should be noted that if the neutral eccentric 114 is not facing to the tractor near, the hydro-lock hooks will not latch over the cam follower. If this is the case, the eccentric 114 must be rotated 180 degrees to correct this situation.

Next, with the seat set in the most rearward position, set the nylon cap nut (not shown) on rod 296 to be one to two millimeters from the bottom of the seat pan. This is accomplished by loosening the lock nut under the nylon cap nut and turning the cap nut on or off rod to obtain the dimensions. Once this one to two millimeter dimension is obtained, tighten the lock nut.

A final functional check of the system is accomplished by: (1) pushing on the forward 116 or reverse 118 control pedals. When pushed, the pedals should not move when the park brake cam 270 is locked or when the operator is not occupying the operator seat. Likewise, the foot pedals 116, 118 should move freely when the parking brake is released and the operator is occupying the seat.

In order to properly adjust each of the brake linkages, a pair of right and left adjusting bolts 304 (only the right bolt 304 is visible) are loosened. Next, a pair of jam nuts 310, 312 on each of the right and left brake rods 210 is loosened. The parking brake is set in the first notch of cam 270. The back jam nut 310 of one of the linkages is tightened until the brake starts to engage. Next, the associated front jam nut 312 is tightened. Thereafter, the park brake is released and the appropriate adjusting bolt 304 is tightened until it hits the member 208. At this point, the jam nut on the adjusting bolt 311 should be locked. The above steps pertaining to only one of the linkages should then be performed on the other of the brake linkage.

DETAILED DESCRIPTION OF AN ALTERNaTE EMBODIMENT

Referring now to the drawings and specifically to FIGS. 9–15, there is illustrated an alternate embodiment incorporating the present invention, generally indicated as 400, installed on a front mount mower. The front mount mower is generally conventionally constructed except for the present invention which results in an improved system and method for controlling vehicle ground speed and for enhancing maneuverability.

Figure 10:
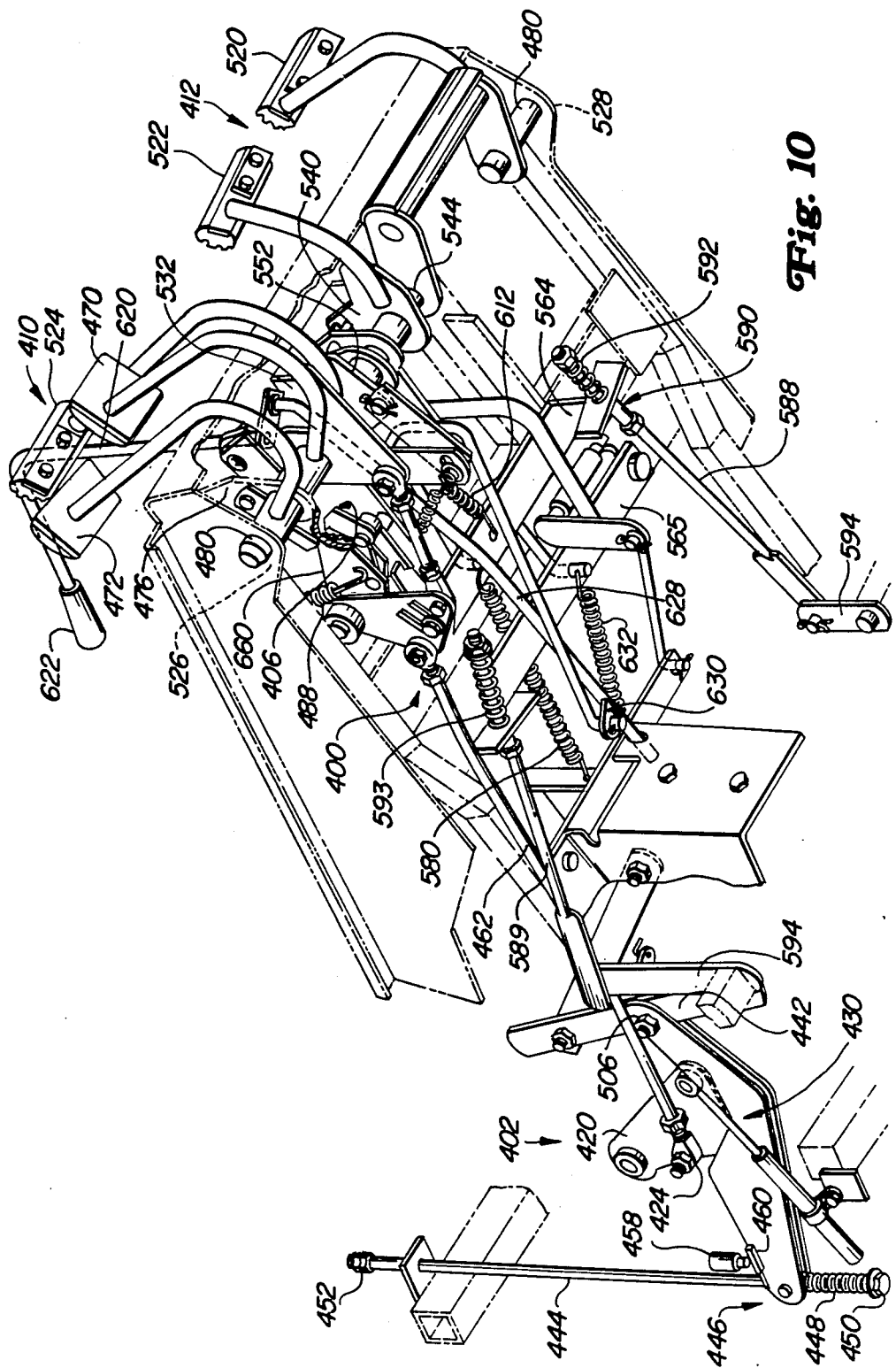
FIG. 10 is a partial perspective bottom view of the front mount mower of FIG. 9.
Figure 14:
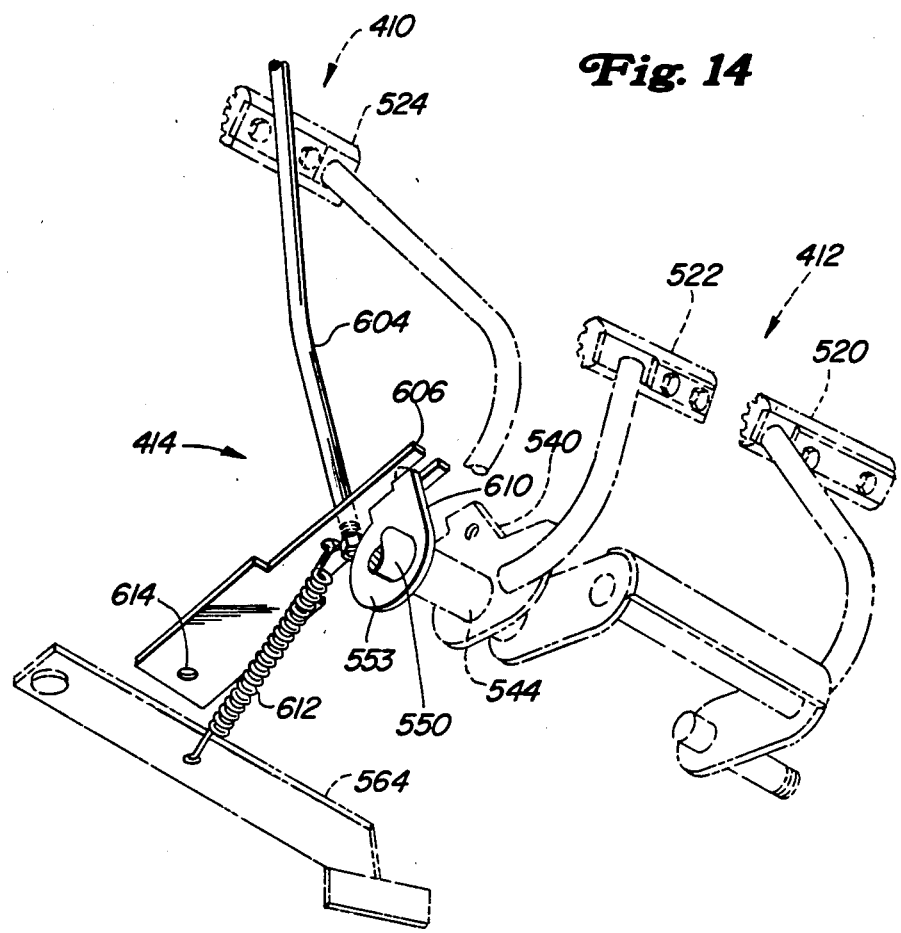
FIG. 14 is a partial perspective view of the parking brake system of the front mount mower of FIG. 10.
Figure 15:
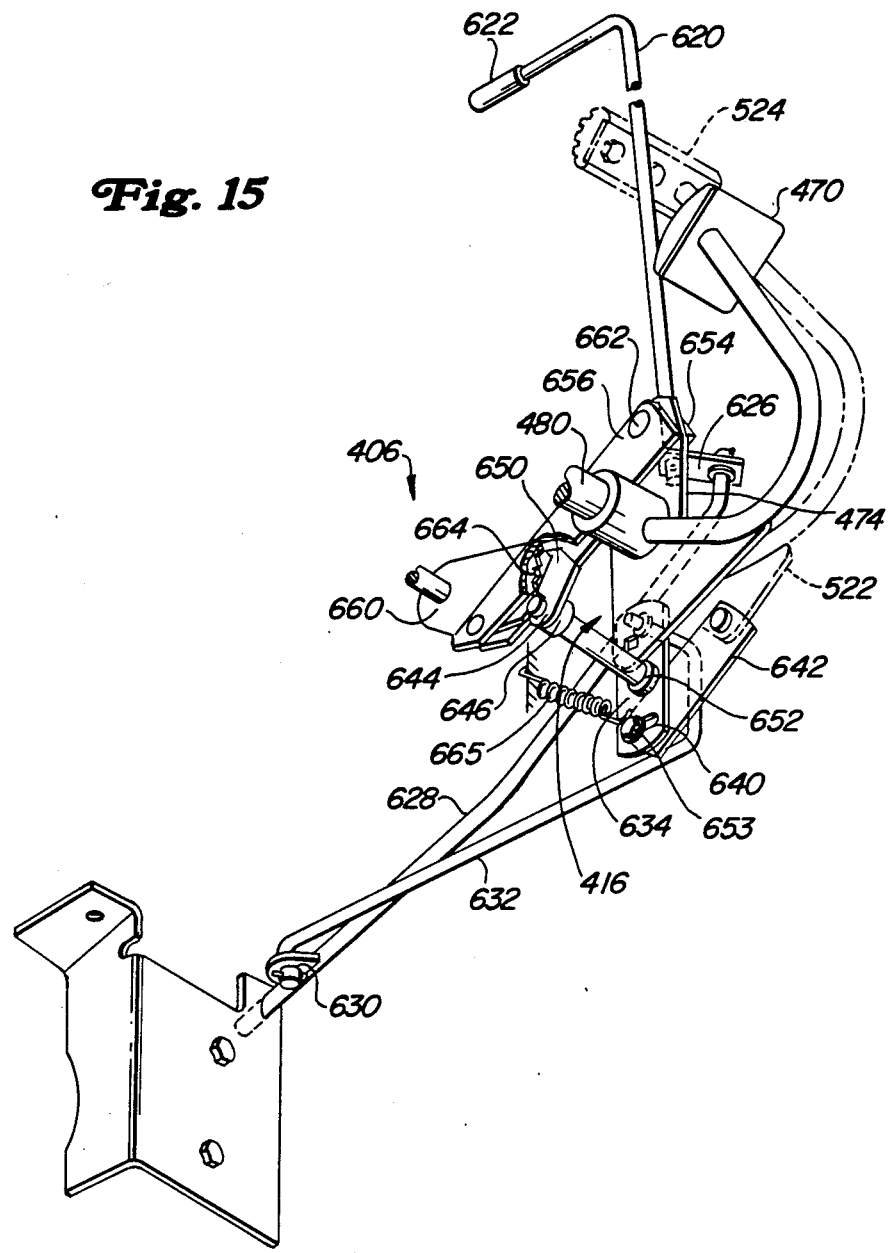
FIG. 15 is a partial perspective view of the cruise control system of the front mount mower of FIG. 10.

As shown in FIGS. 10, 14 and 15, vehicle subsystems, which, when combined, form the ground speed control system of the present invention include: a system 402 for initially precisely establishing an accurate hydrostatic transmission neutral position and for automatically returning the hydrostatic transmission to the neutral position; a forward and reverse direction control foot pedal system 404; a cruise control system 406; a brake system consisting of: a service brake control system 410, a left and a right turn brake control system 412, and a parking brake system 414; a system 416 for interconnecting the cruise control to the brake system and the forward control pedal and a plurality of means interconnected to the cruise control system for selectively disengaging the cruise control system 406.

Prior to describing each individual subsystem and their interconnection, it is important to note that for proper vehicle operation the neutral hydrostatic transmission position must be initially precisely located and thereafter be accurately reestablished by a system for accurately automatically returning the transmission to the neutral position upon disengagement of either of the forward and reverse direction foot control pedals.

Figure 11:
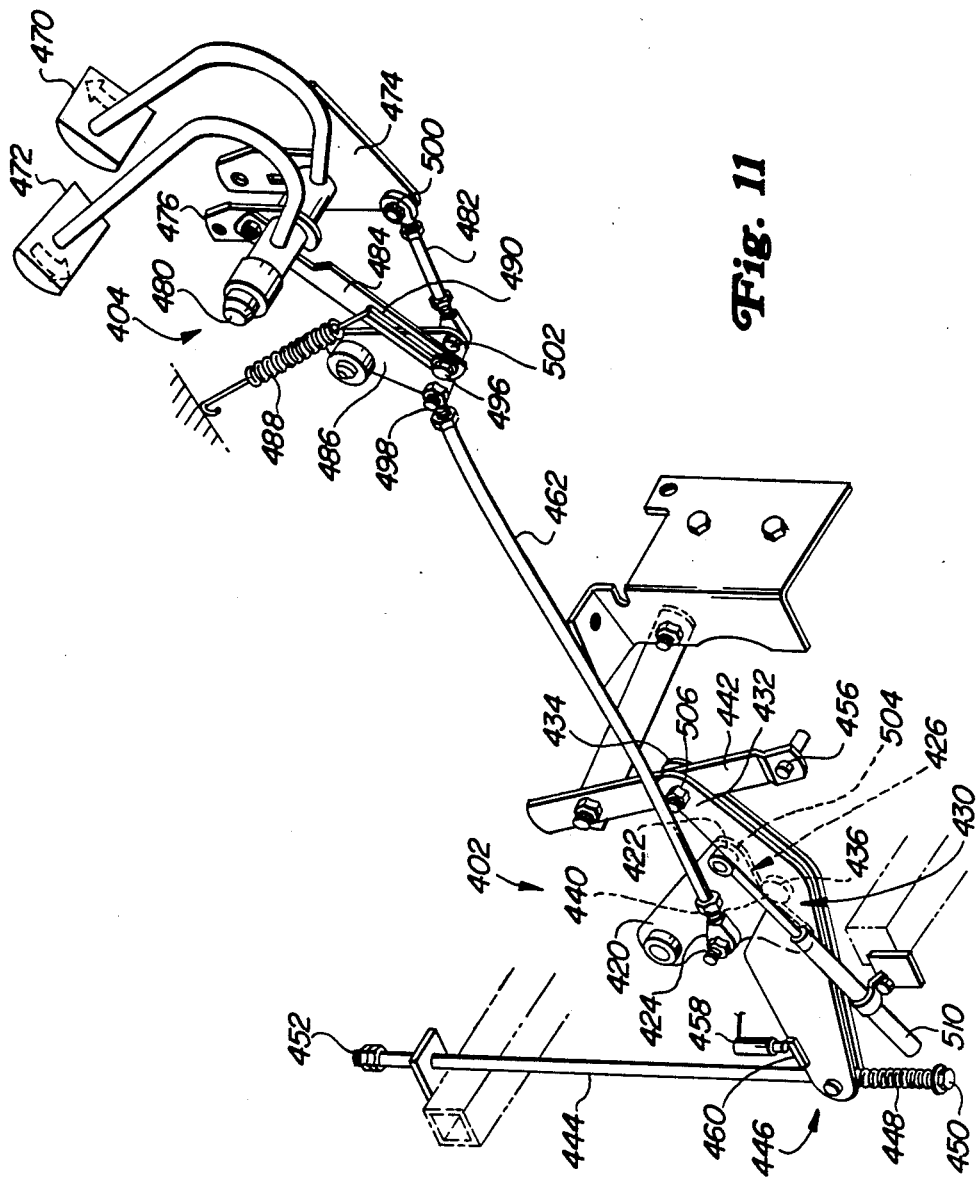
FIG. 11 is a partial view illustrating the interconnection of the neutral location and return system and the pedal system of the front mount mower of FIG. 10.

As shown in FIG. 11, the neutral location and return system 402 linkage is adjustable relative to a shaft connected to a swash plate such that the transmission neutral position can be precisely located and that no ground speed motion (creep) will occur from an engine drive input. This adjustable neutral linkage design consists of a fixed fulcrum for an adjustable arm, a cam profile on a swash plate arm, a cam follower, a cam follower rod, a shock absorber and a pedal system connecting rod.

Specifically, a swash plate arm cam 420 has a V-shaped surface 426 and includes a shock absorber mount 422 and a connection point 424 for the foot pedal system 404.

The cam follower 430 consists of two identical plates 432, 434 spaced apart by a roller 436 mounted between the two plates. When assembled to the vehicle, the roller 436 is assembled in the apex of the V-shaped portion 426 of the cam 420. The cam follower 430 is connected to an adjustable arm 442 at one end and a rod 444 at the other end. The rod 444 is mounted through a link 446 and has a spring 448 positioned between the rod end and the link 446. An opposite end 452 of the rod protrudes through an aperture in the frame. A nut 450 is utilized to vary the compression of spring 448.

Precise location of the neutral position is accomplished by adjusting the arm 442 relative to a fixed fulcrum 456. The adjustable arm 442 in turn adjusts the roller 436 that is centered in the cam V until there is no wheel rotation. Once the neutral position is so located, an electrical neutral start switch 458 is adjusted relative to the cam follower 430 to enable the neutral position to be sensed electronically. This is accomplished by the neutral start switch striker 460 which is connected to the cam follower 430 proximate the rod end. The switch 458 is adjusted relative to the striker 460 with the transmission in neutral by means of a plate (not shown) which is connected to the transmission. In order to relatively adjust the switch 458 to the striker 460, the plate has at least two elongated slots (not shown) formed therein.

In order to rotate the transmission swash plate arm 420 from the neutral position, the forward and reverse pedal system 404 is connected to the neutral position location system 402 by an adjustable connection rod 462.

The foot pedal control system 404 is provided for selectively operating the vehicle in either the forward or reverse direction. The foot pedal control system is right foot operated. The foot pedal control system, consists of inboard 470 (forward) and outboard 472 (reverse) pedals each having arms 474, 476 pivotally mounted on a shaft 480. Forward and reverse links 482, 484 are respectively connected to the pedal arms 474, 476 and to a transfer pivot arm 486. A spring 488 is attached to the reverse link 484 through slot 490. The transfer pivot arm 486 is also connected to the adjustable connection rod 462 which is connected to and moves the swash plate arm 420 attached to the hydrostatic transmission.

As clearly seen in FIG. 11, the reverse link 484 is attached to the reverse pedal arm 476 at a point above the pedal shaft 480 and is connected to the transfer pivot arm 486 at a pivot point 496 below the connection rod pivot point connection 498. The forward link 482 is connected to the forward pedal arm 474 at a point 500 below the shaft 480 and to the transfer pivot arm 486 at a pivot point 502 below both the reverse link pivot 496 and the connecting link pivot point 498.

The relative locations of the three transfer pivot arm connection points provides the means by which the pedal system is able selectively to propel the vehicle in either the forward or reverse direction. Also, the relative length of the two links 482, 484 controls the relative forward and reverse speeds. As illustrated, the reverse pedal link 484 is double the length of the forward pedal link 482 thereby providing that the maximum reverse speed will be one half the maximum forward speed. It should be understood by those skilled in the art that this relative speed ratio could be varied to achieve any desired relative forward and reverse speeds.

As illustrated, an operator utilizes the inboard pedal 470 to operate the mower in the forward direction and the outboard 472 pedal to operate the mower in the reverse direction. By depressing the respective pedals varying distances, an operator can control the ground speed of the mower in both the forward and reverse directions.

If neither pedal is depressed, the neutral return system 402 automatically positions the hydrostatic transmission in the neutral position. The return system is activated when the operator releases either pedal. When either pedal is released from the depressed position, the neutral return system slows the ground speed rapidly from that which the vehicle was operating to zero without brake assistance by automatically returning the transmission to the neutral position.

As shown in FIG. 11, when the forward pedal 470 is depressed, the forward arm 474 is rotated clockwise, rotating the transfer pivot arm 486 clockwise. This rotation compresses the connection link 462 thereby rotating the cam arm 420 clockwise causing the roller 436 to move along a forward edge 504 of the cam V 426. The cam motion causes the cam follower 430 to rotate counterclockwise about a pivot point 506 thereby compressing the spring 448 on rod 444. Upon release of the forward pedal 470, rod spring 448 urges the cam follower 430 to return the roller 436 to the apex 440 of the cam V 426. A shock absorber 510 provides for even compression and decompression of the rod spring 448 and, thus, even, smooth deceleration or acceleration of the vehicle.

The rod spring 448 tends to force the cam follower and the cam to the neutral position. The shock absorber 510 retards motion in either direction and provides a controlled rate of acceleration or deceleration of the ground speed in either direction. This prevents nearly instantaneous acceleration or deceleration or what is know as the bucking bronco affect and thereby provides for smooth ground speed control.

Elongated slot 490 in the link 484 provides a safety feature for the pedal system. Specifically, since the forward and reverse pedals operate in tandem, which means when the forward pedal is depressed the reverse pedal is in a raised position, if an object were to lodge under the reverse pedal arm, it would tend to continue to rotate the pedal clockwise about shaft 480. Without slot 490, forward pedal 470 would be rotated further clockwise, thus increasing the speed of the vehicle. However, since the link 484 has slot 490, rotation of reverse pedal 472 counterclockwise will not further rotate the forward pedal 470. This allows an operator to continue to exercise positive control over the vehicle even if an object were to become lodged under the reverse pedal arm.

As shown in FIGS. 10 and 12–14, the turn brake subsystem 412 is left foot operated and consists of an outboard (left turn) 520 and an inboard (right turn) 522 pedal. By depressing either of the respective pedals, braking force is transmitted to the respective wheels thus enhancing vehicle maneuverability.

The service brake subsystem 410 is right foot operated and applies both the left and right brakes simultaneously. The service brake provides the park brake lock surface and senses the service brake system rest position electronically through utilization of a conventional electric switch which interacts with the service brake.

All brake pedals, that is to say, a left turn brake pedal 520, a right turn brake pedal 522 and a service brake pedal 524 pivot about and are mounted on the same shaft as the direction control foot pedal system. The left turn brake pedal is connected directly to the shaft 480 about which the forward and reverse direction control foot pedals rotate. The shaft 480 is supported by two outboard frame members 526, 528 and an interior frame member located proximate a service brake hub.

Figure 12:
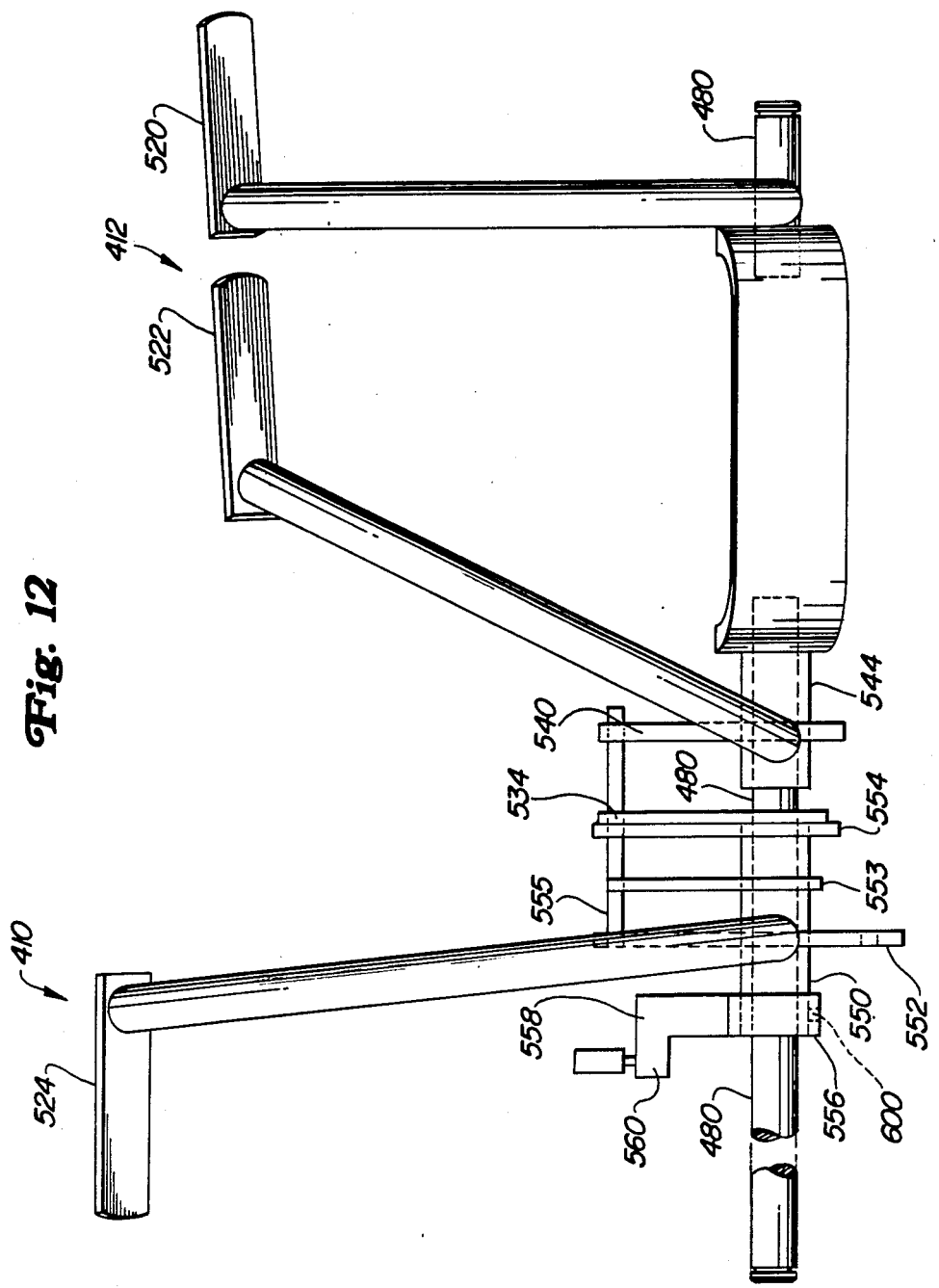
FIG. 12 is a partial front view of the turn and service brake pedals of the front mount mower of FIG. 10.
Figure 13:
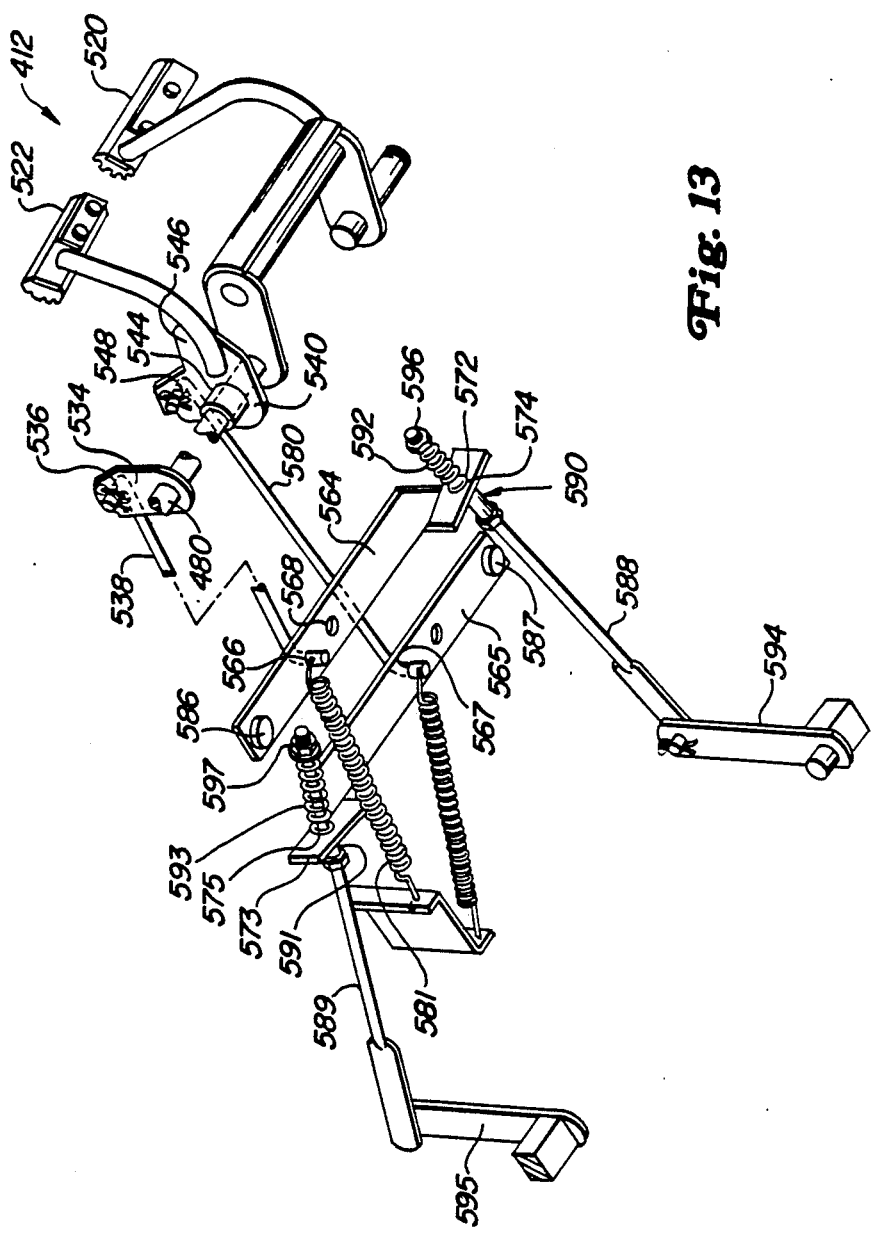
FIG. 13 is a partial perspective view of the brake system of the front mount mower of FIG. 10.

As shown in FIGS. 12 and 13, the left turn brake pedal 520 is connected to the shaft 480 proximate frame member 528 (see FIG. 10). An arm 534 is connected to the shaft, preferably remote from the pedal 520 connection. The arm 534 has a brake rod connection aperture 536 forming a bearing surface that receives an out turned end of a rod 538.

The right turn brake pedal 522 is connected to a hub 544 which is rotatably mounted about shaft 480. An arm 540 is connected to the hub 544 and has a brake rod connection aperture 548 which forms a bearing surface for receiving an end of a second rod 580 similar to rod 538.

The service brake pedal 524 is connected to a second hub 550 which also rotates about the shaft 480. Hub 550 has three arms 552, 553 and 554 connected thereto. A bar 555 is connected to the arms 552 and 554 and extends parallel to the shaft 480 so that contact with arms 534 and 540 might be made. A third hub 556 having an L-shaped arm 558 is rotatable about the service brake hub 550 proximate the first arm 552. This hub 556 is adjustably mounted on the service brake hub 550 and the L-shaped arm 558 extending therefrom is adapted for contacting and interacting with a brake sensing switch (not shown) mounted to the frame.

As seen in FIG. 13, the two rods 538, 580 respectively extend from the connect each brake pedal arms 534, 540 and transfer arms 564, 565 respective down-turned rear ends received in apertures 566, 567 respectively. A brake return spring 581 is attached to each of the brake rods 538, 580. The two transfer arms 564, 565, have respective pivot points 586, 587 at first ends thereof and have respective flanges 572, 573 at second ends thereof. The flanges 572, 573 are respectfully provided with connection apertures 574, 575 in which are respectively received adjustable brake rods 588, 589 which are respectfully pivotally connected to conventional drum brake arms 594, 595. The adjustable brake rods 588, 589 are slidably received in the apertures 574, 575 in the transfer arm flanges 572, 573 and have tubes 590, 591 received thereon for covering one end of the rods 588, 589 for protecting the adjustment threads thereof, high torque compression springs 592, 593 are mounted over the tubes and are secured thereon by threaded nuts 596, 597 received on threaded ends of the rods 588, 589. When a given turn brake pedal is applied, the associated transfer arm pivots forwardly and effects forward movement of the associated brake rod by way of the spring carried by the rod to effect engagement of the brake controlled by the rod.

Service brake pedal 524 depression will cause both turn brake arms 534, 540 to rotate yet, when desired, allows individual turn brake operation. The middle service brake hub arm 553 has a profile shape for engaging the parking brake system 410. This profile guides, retains and locks a park brake pawl 606.

The arm 552 has a lower extending portion with a connection aperture for interfacing with the cruise control system. This arm also has a profile shape which provides a rest stop position for all three pedals.

The electrical switch affixed to the frame has a plunger for interacting with a switch striker 560 which is pivotally and adjustably mounted on the hub 550, preferably by a set screw 600. Having the service brake at rest, the switch striker is adjusted to depress the switch plunger. With this construction, the service brake position can be electronically sensed relative to the rest brake position. A tension body return spring attached to the service brake hub biases the service brake clockwise such that the upper brake arm strikes a frame member. The switch striker is adjusted to depress the switch when the brake is in the rest position against the frame, thus, when the service brake is rotated, the striker will disengage the switch plunger and thus indicate that the service brake is being depressed.

This allows an operator to dismount the front mount mower with the parking brake set. If he dismounts the mower without setting the parking brake, the engine will automatically shut-off. Also, the front mount mower must be in neutral when the operator dismounts. If the front mount mower is not in neutral, the engine will also automatically shut-off. These two switches are coordinated with an electrical switch (not shown) which senses pressure on the operators seat. Thus, when the seat switch senses sufficient pressure, the vehicle must be in neutral as determined by the neutral start switch in order to start the engine. If the seat switch sense insufficient pressure and the brake switch plunger is engaged by the arm 558, the engine will not start.

The reason that these two switches were incorporated into the front mount mower is to ensure that the front mount mower is in neutral with the parking brake engaged prior to an operator leaving his seat. This prevents vehicle movement by accidental engagement of the forward or reverse pedal when an operator is not in the operator's seat thereby preventing possible injury to himself or someone else in the vicinity of the mower.

As shown in FIG. 14, the parking brake system 414 is a hand operated system which, as illustrated, requires that a rod 604 be lifted and lowered from an inverted J-shaped slot while simultaneously depressing the service brake pedal until the park brake pawl 606 falls into the locked position provided by the middle arm 553 on the service brake hub 550. The park brake pawl 606 is pivotally mounted to the frame. A spring 612 biases the frame pivot 614 toward the parking brake arm 553. An aperture in the park brake pawl is used to connect the parking brake rod 604 to the pawl 606. The rod 604 is adjustable for positioning the pawl 606 relative the arm 553 so that the pawl will not engage the arm in the rest position.

In order for an operator to leave the operators seat, with the engine running, the parking brake must be engaged, i.e. the arm 558 on hub 556 must not depress the switch plunger (see FIG. 12) and the transmission must be in neutral i.e. the neutral start switch plunger must be depressed (see FIG. 11). If the seat pressure switch senses low pressure or insufficient pressure and both the above conditions are not met, the engine will automatically shut down.

As illustrated in FIGS. 10 and 15, the cruise control system 406 is right-hand operated with an L-shaped control lever or rod 620 being located just beneath the steering wheel. The cruise control system 406 can only be engaged when the front mount mower is moving in the forward direction. To engage the cruise control, clockwise lever rotation is required. As with the compact utility tractor cruise system, disengagement can be accomplished in three ways: (1) by reverse or counterclockwise rotation of the lever 620, (2) further depressing the forward foot pedal 470 and (3) depressing the service brake pedal 524.

The cruise control system is a mechanical linkage system that utilizes a ratchet and pawl device for positive swash plate position retention. The cruise control system linkage consists of the L-shaped lever or rod 620 having a knob 622 at the short end of the L and being conventionally connected to a first cruise control arm 626 at the other end. The first cruise control arm 626 is also conventionally connected to one end of a first cruise control link 628 having a pivot point aperture 630 attached proximate its other end. A second cruise control link 632 has a down-turned rear end received in the pivot point aperture 630 and has an in-turned forward end received in an aperture provided in an upper end of a second cruise control arm 634. The second cruise control arm 634 has an elongated slot 640 adjacent its lower end and is connected to a lower extension of the service brake arm 522 by a third cruise control link 642. A shaft 646 pivotally connected to a vehicle frame connects the pawl 644 to the second arm 634 at a central pivot point 652. The third link 642 connects the second arm 634 by pivot bolts 653 received in the slot 640 at a point below the shaft 480.

Two connecting links 654, 656 positioned on opposite sides of the forward foot pedal arm 474 have lower ends connected to a pivotable ratchet 660 and having upper ends pivotally connected to the forward control pedal arm 474 at a pivot 662 above the pedal shaft 480. As the forward pedal 470 is depressed, the two links are rotated clockwise about the pivot 662 raising the ratchet 660 relative to the pawl 644.

As illustrated, to engage the cruise control system, after depressing the forward pedal 470, the cruise control lever 620 is hand rotated away from the operator or clockwise toward the front mower thereby rotating the first arm 626 clockwise compressing the first cruise control rod 628 which in turn pulls the second cruise control rod 632 rearwardly rotating the second cruise control connection counterclockwise. This movement results in the rotation of a hook member 650 of the pawl 644 clockwise. The hook member 650 is thus rotated into engagement with one of a plurality of teeth 664 in the ratchet 660.

The cruise control system can be applied only to the forward foot pedal because depression of the reverse pedal rotates the ratchet teeth out of alignment with the pawl thereby preventing engagement of the ratchet teeth by the pawl.

As stated above, cruise control disengagement is accomplished in three ways: (1) by an operator further depressing the forward foot pedal 470, (2) by an operator depressing the service brake pedal 524 and (3) by an operator rotating the cruise control lever 620 toward the operator's seat (clockwise).

In the last two of the above three situations, the hook member 650 is literally pulled away from engagement with the ratchet 660. In the case of further depressing the forward foot pedal 470, the contact pressure between the hook member 650 and the ratchet teeth 664 is released allowing a spring to rotate the second cruise control arm 634 clockwise thereby rotating the hook out of contact with the ratchet teeth. Once disengaged, the spring biases the pawl out of contact with the ratchet thereby allowing the neutral return system to automatically return the swash plate cam to neutral.

In the case of depressing the service brake pedal 524, since the service brake arm 552 is connected to the second cruise control arm 634 through an elongated slot 640 this will cause the second arm 634 to rotate clockwise, rotating the pawl 650 out of contact with the teeth 664.

In the case of rotating the cruise control lever 632 counterclockwise, this will reverse the sequence of engagement discussed above and rotate the hook 650 out of contact with one of the teeth 664.

In order to assemble the turn brake control and service brake control systems, the parking brake system, the foot pedal control system, the hydro-neutral return system, and the cruise control system, it is necessary to make the following adjustments. First, rotate the forward foot pedal 470 by depressing it, to the maximum extent, to a forward stop position and the swash plate cam 420 to the full forward position; adjust the connection link 482 to the respective connection hole and tighten and fasten thereto; locate the neutral position and tighten the adjustment bolt; adjust the neutral start switch 458 relative to the neutral return linkage; depress the forward pedal; engage the cruise control linkage; adjust the link 642 between the brake arm 522 and the cruise arm 634 so that there is a slight gap therebetween while maintaining the service brake pedal 524 at rest; with the service pedal brake pedal 524 still at rest, adjust the service brake switch (not shown) so that any pedal movement will operate the switch; set the park brake by lowering the control rod 604 and depressing the service brake pedal 524 until the parking brake pawl 606 falls into its locked position; and adjust the compression springs 592, 593 to a predetermined load on the adjustable brake rods 588, 589.

Therefore it can be seen that the improved system and method of the present invention provides positive foot control, selectively engageable and disengageable cruise control and braking. As illustrated, the pedal control system requires deliberate motion in changing from forward to reverse, yet the foot motion is kept relative to the vehicle frame. Since the foot pedals are automatically returned to the neutral position by the neutral return system upon removing pressure, the vehicle ground motion is smoothly reduced and quickly stopped. The cruise control system, when engaged, provides for positive swash plate location thereby eliminating the need for an operator to apply a constant foot pressure to the forward pedal. If an operator should desire to regain manual control of the vehicle from the cruise control, the cruise control is easily disengaged by slightly depressing the forward foot pedal beyond the position in which the cruise control has locked the pedal. This disengagement method provides for smooth transition between automatic cruise controlled and operator controlled ground speed. The cruise control system can also be selectively disengaged by rotating the cruise control lever back toward the operator or by depressing the service brake.

The maneuverability enhancing left and right turn brake pedals of the brake system provide for turning assistance and thus enhancing maneuverability even while the cruise control system is engaged.

In an emergency, in order to positively stop the vehicle, the right foot must be removed from the forward or reverse foot control pedal and utilized to engage the service brake control pedal. The electrical switches incorporated into this system provide transmission neutral position, operator presence and brake pedal position sensing.

Therefore, it appears from the above descriptions, that all of the objects of the present invention have been met.

While the methods herein described, and the forms of apparatus for carrying these methods into effect, constitute preferred embodiments of this invention, it is to be understood that the invention is not limited to these precise methods and forms of apparatus, and that changes may be made in either without departing from the scope of the invention, which is defined in the appended claims.

What is claimed:

1. A system for controlling the ground speed of a vehicle having an operator seat, an engine and a hydrostatic transmission operatively connected for driving a pair of ground wheels and having a swash plate selectively moveable among neutral, forward and reverse drive positions, and a pair of brakes respectively operatively connected to the pair of wheels, said system comprising:

means, operatively connected to said swash plate, for precisely locating the neutral position of said swash plate;

direction control means, operatively connected to said swash plate and said precisely locating means, for selectively controlling said swash plate for driving said vehicle in either a forward or a reverse direction, said direction control means further comprising:

at least two foot control pedals operatively connected to said transmission, one of said pedals controlling the forward ground speed and the second of said pedals controlling the reverse ground speed thereof, both of said pedals being operated by the same foot;

means, operatively connected to said foot pedals, for automatically returning said transmission to said initial neutral position;

a first hub having an arm, said first hub being operatively connected to a shaft, said forward control pedal being operatively connected to said hub;

at least a first connecting rod for operatively connecting said first arm to said precisely locating means, a second hub having an arm, said second hub being operatively connected to said shaft and to said reverse control pedal; and at least a second connecting rod for operatively connecting said second hub arm to said precisely locating means;

brake control means, operatively connected to said pair of brakes, for selectively stopping said vehicle;

turning control means, operatively connected to said brake control means, for selectively engaging one or the other of said pair of brakes thereby enhancing said vehicle's maneuverability; and cruise control means, operatively connected to said swash plate for selectively maintaining said swash plate in a constant position while said vehicle is moving in said forward direction.

2. The system of claim 1 further comprising: means, operatively connected to said precisely locating means in said vehicle, for automatically returning said swash plate to said neutral position when said direction control means is disengaged.

3. The system of claim 1 further comprising: means, operatively connected to said direction control means and to said brake control means, for selectively preventing said direction control means from being inadvertently engaged thereby positively preventing vehicle movement.

4. The system of claim 3 wherein said preventing means further comprises:

means, operatively connected to said operator seat, for sensing when said operator seat is unoccupied.

5. The system of claim 4 wherein said sensing means further comprises:

a lever pivotally connected to said vehicle and having a flange with an aperture at one end and a hook member attached to the other end;

a rod connected to said lever through said aperture and having a spring positioned at the end connected to said lever and being in contact with said seat with the other end; and a spring connected to said lever proximate said rod for biasing said lever toward said seat, said seat being biased away from said compression contact with said rod such that when said seat is biased away from contact with said rod, said hook member engages said precisely locating means thereby positively locking said transmission in said neutral position.

6. The system of claim 4 wherein said sensing means further comprises:

means, operatively attached to said brake control means for sensing when said stopping means are engaged; and means, operatively connected to said precisely locating means for sensing when said transmission is in the neutral position.

7. The system of claim 6 wherein said sensing means further comprises:
a first pressure sensitive electric switch operatively connected to said operators seat;
a second switch operatively connected to said vehicle for interacting with said brake control means and being interconnected with said pressure switch in said seat;
a third switch operatively connected to said transmission for interacting with said precisely locating means and being interconnected with said first switch and said second switch such that said engine will automatically shut off when said pressure on said seat reaches or goes below a certain level.

8. The system of claim 7 wherein when said brake control means is in the rest position engaging said second switch and said pressure on said first switch is below said predetermined level, said engine shuts down.

9. The system of claim 8 wherein when said third switch is not engaged by said precisely locating means and said first switch pressure is at or below said predetermined level, said engine will not start.

10. The system of claim 7 wherein unless said second switch is engaged by said brake control means, said third switch is engaged by said precisely locating means and said first switch is above said predetermined pressure point amount, said engine can not be started.

11. The system of claim 1 further comprising:
parking brake means including linkage means, operatively connected to said brake control means, for preventing said vehicle from being operated when said parking brake means is at least partially engaged.

12. The system of claim 11 wherein the linkage means is operative to prevent accidental engagement of either of said forward or said reverse pedals when an operator mounts or dismounts said vehicle with the engine running.

13. The system of claim 11 wherein said parking brake means further comprises:
cam means;
a first rod operatively connected to said cam means;
an arm having a hook end;
a second rod operatively connected to said arm; and
a cam follower having a flange, said hook end of said arm engaging said flange of said cam follower when said parking brake means is at least partially engaged.

14. The system of claim 13 wherein said arm has a slot and said second rod is operatively connected to said slot.

15. A system for controlling the ground speed of a maneuverable off-road vehicle having an operator seat, an engine and a hydrostatic transmission coupled for driving a pair of ground wheels and having a swash plate selectively moveable among neutral, forward and reverse drive positions, and a pair of brakes respectively coupled to the pair of wheels, said system comprising:
means, operatively connected to said swash plate, for precisely locating the neutral position of said swash plate comprising:
cam means pivotably mounted to said transmission at one end and having a V profile at the other end;
cam follower means pivotably connected to said vehicle;
roller means, operatively connected to said cam follower and being rotatably positioned in the V end of said cam;
spring means for biasing an upper end of said cam follower toward said V of said cam and being operatively attached to the lower end of said cam follower means at one end and being adjustably attached to the vehicle at said other end;
an electrical switch having a plunger operatively connected to said cam such that said switch plunger is positioned proximate said V's apex whereby when said roller is positioned in said cam V apex, said transmission is in the neutral position and said plunger is depressed by a second roller operatively connected to said first roller thereby sensing said neutral position;
direction control means, operatively connected to said swash plate and said precisely locating means, for selectively controlling said swash plate such that said vehicle is driven in either a forward or a reverse direction;
brake control means, operatively connected to said pair of brakes, for selectively stopping said vehicle;
turning control means, operatively connected to said brake control means, for selectively engaging one or the other of said pair of brakes thereby enhancing said vehicle's maneuverability;
cruise control means, operatively connected to said swash plate, said direction control means and said brake control means, for selectively maintaining said swash plate in a constant position while said vehicle is moving in said forward direction; and
means, operative interconnecting said direction control means, said turning control means and said brake control means, for selectively disengaging said cruise control means such that when said cruise control means is engaged, engagement of either of said forward direction control means or said brake control means or disengagement of said cruise control means is operative to disengage said cruise control means.

16. The system of claim 15 wherein said precise location of said neutral position initially results in zero ground speed when said direction control means is at rest.

17. The system of claim 1 wherein said spring means provides for varying the rate at which said vehicle can be accelerated or decelerated.

18. The system of claim 16 wherein said cruise control means further comprises:
a lever pivotably connected to said vehicle;
a latch cruise control having at least three apertures, one of said apertures being located in one end and a series of teeth being formed in the other end;
means for pivotably mounting said latch cruise control to said vehicle utilizing one of said three apertures;
a strap operatively connected to the aperture nearest said end having said teeth, said strap having an elongated slot proximate the end opposite said connection to said latch cruise control for connection with said brake control means; and
a link operatively connecting said lever and said latch cruise control.

19. The system of claim 15 wherein said brake control means further comprises:
- at least one brake shaft operatively positioned on said vehicle;
- at least one service brake pedal operatively connected to said shaft;
- at least one first brake arm having lost motion means integral therewith operatively connected to said shaft;
- at least a second brake arm operatively connected to said shaft and having at least two studs operatively positioned thereon;
- at least a first brake hub operatively rotatably mounted about said shaft and having a third brake arm having lost motion means integral therewith and extending below said shaft;
- at least a second brake hub operatively connected to said first brake hub and being rotatable about said brake shaft, said hub having a fourth brake arm having lost motion means integral therewith extending below said brake shaft;
- at least a third brake hub operatively connected to said shaft and having a fourth brake arm with lost motion means integral therewith extending below said shaft;
- at least a fourth brake hub rotatably mounted about said shaft and having a fifth brake arm with lost motion means integral therewith extending below said shaft; and
- means for operatively connecting said arms having lost motion means integral therewith to said brakes.

20. The system of claim 19 wherein said connection means further comprises:
- at least two members operatively positioned between said arms having lost motion means;
- a bell crank rotatably connected to said vehicle and having two apertures at each thereof;
- a connection rod operatively connected to said members and being connected to the bottom aperture of said bell crank; and
- a second connection rod operatively connected to said brake and to said upper aperture of said bell crank.

21. The system of claim 15 wherein said brake control means further comprises:
- a brake system consisting of a right and a left turn brake pedal, a service brake pedal and a parking brake engaging means; and
- linkage for connecting said service brake pedal to said cruise control means.

22. The system of claim 21 wherein said brake control means further comprises:
- connection linkage operatively connecting said parking brake engaging means to said cruise control means.

23. The system of claim 21 wherein said turn brake pedals are by the same foot operated.

24. The system of claim 23 further comprising means for selectively applying said left and said right turn brakes such that said vehicle is assisted in making a left and a right turn respectively thereby enhancing said vehicles maneuverability.

25. The system of claim 23 wherein said turn brake pedals are left foot operated.

26. The system of claim 21 wherein, said service brake pedal is operated by the same foot used to operate said direction control means.

27. The system of claim 26 further comprising: means for simultaneously engaging both said left and said right brake pedals by engaging said service brake pedal.

28. The system of claim 27 wherein, engagement of said service brake pedal will disengage said cruise control means thereby automatically returning said hydrostatic transmission to said neutral position.

29. The system of claim 26 wherein said service brake pedal is right foot operated.

30. A system for controlling the ground speed of a vehicle having an operator seat, an engine and a hydrostatic transmission operatively connected for driving a pair of ground wheels and having a swash plate selectively moveable among neutral, forward and reverse drive positions, and a pair of brakes respectively operatively connected to the pair of wheels, said system comprising:
- means, operatively connected to said swash plate, for precisely locating the neutral position of said swash plate, said precisely locating means further comprising:
  - cam means pivotably mounted to said transmission at one end and having a V-profile at the other end;
  - cam follower means pivotably connected to said vehicle and having a flange member at each end thereof;
  - roller means, operatively connected to said cam follower means and being rotatably positioned in the V of said cam means;
  - resilient means for biasing an upper end of said cam follower means towards said V of said cam means and being operatively connected to the lower end of said cam means at one end and being adjustably attached to said vehicle at the other end; and
  - switch means having a plunger operatively connected to said cam means such that when said plunger is positioned proximate said V's apex therefore and said roller is positioned in said cam V apex, said transmission is in the neutral position and said plunger is depressed by a second roller operatively connected to said first roller thereby sensing said neutral position;
- direction control means, operatively connected to said swash plate and said precisely locating means, for selectively positioning said swash plate for driving said vehicle in either a forward or a reverse direction;
- brake control means, operatively connected to said pair of brakes, for selectively stopping said vehicle;
- turning control means, operatively connected to said brake control means, for selectively engaging one or the other of said pair of brakes thereby enhancing said vehicle's maneuverability; and
- cruise control means, operatively connected to said swash plate for selectively maintaining said swash plate in a constant position while said vehicle is moving in said forward direction.

31. The system of claim 15 or 30 wherein said direction control means further comprises:
- at least two foot control pedals operatively connected to said transmission, one of said pedals controlling the forward ground speed and the second of said pedals controlling the reverse ground speed thereof.

32. The system of claim 31 wherein both of said foot pedals are operated by the same foot operated.

33. The system of claim 32 wherein both of said foot pedals are right foot operated.

34. The system of claim 32 further comprising:
means operatively connected to said foot pedals, for automatically returning said transmission to said initial neutral position.

35. The system of claim 34 wherein said direction control means further comprises:
a forward pedal operatively connected to a shaft by a hub having an arm;
a first connecting rod operatively connected to said hub arm;
a member received on a bolt connected to said precisely locating means at one end and to said connecting rod at the other end;
a reverse pedal operatively connected to said shaft at one end, and having an arm with a flange operatively connected to the other end of said shaft; and
a second connecting rod operatively connecting an upper portion of said arm to said connecting link at the end of said connecting line proximate said precisely locating means.

36. The system of claim 31 wherein said precisely locating means further comprises:
a neutral return system operatively connected to said direction control means.

37. A brake system for an off-road vehicle comprising:
a brake shaft operatively positioned on said vehicle;
a service brake pedal operatively connected to said shaft;
a first brake arm having lost motion means integral therewith operatively connected to said shaft;
a second brake arm operatively connected to said shaft and having at least two studs operatively positioned thereon;
a first brake hub operatively rotatably mounted about said shaft and having a third brake arm having lost motion means integral therewith and extending below said shaft;
a second brake hub operatively connected to said first brake hub and being rotatable about said brake shaft, said hub having a fourth brake arm having lost motion means integral therewith extending below said brake shaft;
a third brake hub operatively connected to said shaft and having a fourth brake arm with lost motion means integral therewith extending below said shaft;
a fourth brake hub rotatably mounted about said shaft and having a fifth brake arm with lost motion means integral therewith extending below said shaft; and
means for connecting said arms having lost motion means integral therewith to said brakes.

38. The brake system of claim 37 wherein said connecting means further comprises:
at least two members operatively positioned between said arms having lost motion means;
a bell crank rotatably connected to said vehicle and having two apertures at each thereof;
a connection rod operatively connected to said members and being connected to the bottom aperture of said bell crank; and
a second connection rod operatively connected to said brake and to said upper aperture of said bell crank.

39. A mechanism for initially precisely locating the neutral position of a hydrostatic transmission installed in a vehicle comprising:
a cam pivotally mounted to said transmission at one end and having a V profile at the other end;
a cam follower pivotally connected to said vehicle and having a flange member at each end thereof;
a roller, operatively attached to said cam follower and being rotatably positioned in the V end of said cam;
a spring for biasing an upper end of said cam follower toward said V of said cam and being operatively connected to said lower end of said cam at one end and being adjustably attached to said vehicle at said other end; and
electrical switch means having plunger means operatively connected to said cam such that said plunger means is positioned proximate said V's apex such that when said roller is positioned in said cam V apex and said transmission is in the neutral position, said plunger means is depressed by a second roller operatively connected to said first roller thereby sensing said neutral position.

40. A mechanism for driving a vehicle having a hydrostatic transmission and means initially for precisely locating the neutral position of the hydrostatic transmission, said mechanism comprising:
at least two foot control pedals operatively connected to said transmission, one of said pedals controls the forward ground speed and the second of said pedals controls the reverse ground speed thereof;
means, operatively connected to said foot pedals, for automatically returning said transmission to said initial neutral position;
a first hub having an arm, said first hub being operatively connected to a shaft, said forward control pedal being operatively connected to said hub;
at least a first connecting rod for connecting said first hub arm to said precisely locating means;
a second hub having an arm, said second hub being operatively connected to said shaft and to said reverse control pedal; and
at least a second connecting rod for connecting said second hub arm to said precisely locating means.

41. The mechanism of claim 40 further comprising:
a shaft;
a forward control pedal operatively connected to said shaft;
a transfer means, having, at least three connection points therein, pivotally connected to said vehicle;
a link operatively connected to the arm of said forward pedal and said transfer means;
a reverse control pedal having an arm operatively connected to said shaft;
a second link having an elongated slot in one end thereof operatively attached to said reverse pedal arm and said transfer means; and
a third link connecting said transfer means with said precisely locating means.

42. The mechanism of claim 40 further comprising:
a neutral return system operatively connected to said foot control pedals.

43. The mechanism of claim 42 wherein said neutral return system further comprises:
a shaft operatively connected to said hydrostatic transmission;
an adjustable arm for establishing a fixed fulcrum;

a connection rod operatively connected to said foot control pedals;

a cam shaped arm operatively positioned on said shaft and having means for mounting a shock absorber and for connecting said connection rod thereto;

a cam follower arm, operatively connected to said adjustable arm at one end thereof, having a cam follower roller operatively positioned therein and having a pivotable link at the other end thereof; and a rod, operatively connected to said pivotable link, having at one end a spring between said rod head and said cam follower arm, a second end protruding into a hole in said vehicle frame, and having an adjustable nut connected thereto for varying the compressing of said spring.

44. The mechanism of claim 40 wherein said two-foot control pedals are operated by the same foot.

45. The mechanism of claim 44 wherein said foot control pedals are right foot operated.

46. A system for controlling the ground speed and direction of a vehicle having a variable speed transmission, and said system comprising:

at least a forward and a reverse foot operated pedal each operatively connected to said transmission;

means, operatively connected to said transmission, for precisely locating the neutral position of said transmission;

means, operatively connecting said foot pedals and said precisely locating means, for automatically returning said transmission to said neutral position upon disengagement of either of said foot pedals;

a first hub having an arm, said first hub being operatively connected to a shaft, said forward pedal being operatively connected to said hub;

at least a first connecting rod for connecting said first hub arm to said precisely locating means;

a second hub having an arm, said second hub being operatively connected to said shaft and to said reverse pedal; and at least a second connecting rod for connecting said second hub arm to said precisely locating means.

47. The system of claim 46 further comprising:

means, operatively connected to said transmission, for rotating a swash plate about a pivot;

at least one rod connecting each of said foot pedals to said rotating means; and means for connecting said rotating means and said swash plate.

48. The system of claim 47 wherein said swash plate rotating means further comprises:

at least one member having at least two arms rotatably mounted on a shaft, one of said arms extends above said shaft and the other of said arms extends below said shaft; and a rod, operatively interconnecting said member with a cam, said cam being operatively connected to said swash plate.

49. The system of claim 48 further comprising:

means, operatively connected to said cam, for returning said swash plate to a neutral position.

50. A system for controlling the ground speed of a vehicle having an engine and a hydrostatic transmission having a swash plate, said system comprising:

a forward control pedal;

a reverse control pedal;

means for locating a neutral position of the hydrostatic transmission;

means, operatively connected to said locating means and said forward and reverse control pedals, for automatically returning said swash plate of said transmission to said neutral position;

transfer means, operatively interconnecting said forward and reverse control pedals with said locating means, for changing the position of said swash plate in response to position changes of said forward and reverse pedals, respectfully;

a first hub having an arm, said first hub being operatively connected to a shaft, said forward control pedal being operatively connected to said hub;

at least a first connecting rod for connecting said first hub arm to said locating means;

a second hub having an arm, said second hub being operatively connected to said shaft and to said reverse control pedal; and at least a second connecting rod for connecting said second hub arm to said locating means.

51. The system of claim 50 wherein said transfer means further comprises:

at least one pivot means;

at least a first connection rod operatively connecting said forward control pedal with said pivot means;

at least a second connection rod operatively connecting said reverse pedal with said pivot means; and at least a third connection rod operatively connecting said pivot means with said locating means.

52. The system of claim 50 wherein said locating means further comprises:

a cam having a V-shaped notch operatively connected to said swash plate; and a cam follower operatively connected to said vehicle and having a roller member operatively connected thereto, said roller member being operatively positioned in said V-shaped notch.

53. The system of claim 52 wherein said automatic returning means further comprises:

resilient means, operatively connected to said cam follower, for biasing said roller means towards said V-shaped notch whenever said transfer means positions said swash plate in any position other than said neutral position.

54. The system of claim 53 wherein after said neutral position is located, said cam is connected to said swash plate such that said roller member is positioned in said V-shaped notch.

55. The system of claim 54 wherein when said swash plate is in said neutral position, said roller member is in said V-notch and neither said forward or reverse control pedals are acting on said transfer means.

56. A system for controlling the ground speed of a vehicle having an engine and a hydrostatic transmission having a swash plate, said system comprising:

a forward control pedal;

a reverse control pedal;

a cam having a V-shaped notch operatively connected to said swash plate;

a cam follower operatively connected to said vehicle and having a roller member operatively connected thereto, said roller member being operatively positioned in the apex of said V-shaped notch when said swash plate is a neutral position;

resilient means, operatively connected to said cam follower, for biasing said roller member towards said apex of said V-shaped notch when said swash plate is positioned in any position other than said neutral position;

at least one pivot means;

at least a first connecting rod operatively connecting said forward control pedal with said pivot means;

at least a second connecting rod operatively connecting said reverse control pedal with said pivot means;

a first hub having an arm operatively connecting said forward control pedal with said first connecting rod; and a second hub having an arm operatively connecting said reverse control pedal with said second connecting rod.

57. A mechanism for preventing inadvertent movement of a vehicle having a hydrostatic transmission, a pedal control system and a means for precisely locating the neutral position of said hydrostatic transmission, said mechanism comprising:

a lever pivotally connected to said vehicle and having a flange with an aperture at one end and a hook member attached to the other end;

a rod connected to said lever through said aperture and having a spring positioned at the end connected to said lever and being in contact with a seat with the other end; and a spring connected to said lever proximate said rod for biasing said lever toward said seat, said seat being biased away from contact with said rod such that when said seat is biased away from contact with said rod, said hook member engages said precisely locating means thereby positively locking said transmission in said neutral position.

58. A system for controlling the ground speed of a vehicle having an operator seat, an engine and a variable speed transmission coupled for driving a pair of ground wheels and having a control shaft selectively movable among neutral, forward and reverse drive positions, and a pair of brakes respectively coupled to the pair of wheels, said system comprising:

means, operatively connected to said control shaft, for precisely locating the neutral position of said control shaft;

direction control means, operatively connected to said control shaft and said precisely locating means, for selectively controlling said control shaft such that said vehicle is driven in either a forward or a reverse direction, said direction control means further comprising:

a forward foot control pedal operatively connected to a shaft by a hub having an arm;

a first connecting rod operatively connected to said first hub arm and to said transmission;

a member received on a bolt connected to said precisely locating means at one end and to said connecting rod at the other end;

a reverse foot control pedal operatively connected to said shaft at one end, and having an arm with a flange operatively connected to the other end of said shaft; and a second connecting rod operatively connected to an upper portion of said reverse pedal arm and to said member;

means, operatively connected to each of said foot pedals for automatically returning said transmission to said initial neutral position;

brake control means, operatively connected to said pair of brakes, for selectively stopping said vehicle;

turning control means, operatively connected to said brake control means, for selectively engaging one or the other of said pair of brakes thereby enhancing said vehicle's maneuverability;

cruise control means, operatively connected to said control shaft, said direction control means and said brake control means, for selectively maintaining said control shaft in a constant position while said vehicle is moving in said forward direction, and means, operatively interconnecting said direction control means, said turning control means and said brake control means for selectively disengaging said cruise control means such that when said cruise control means is engaged, engagement of either of said forward direction control means or said brake control means or disengagement of said cruise control means is operative to disengage said cruise control means.

* * * * *

UNITED STATES PATENT AND TRADEMARK OFFICE
CERTIFICATE OF CORRECTION

PATENT NO. : 4,759,417

DATED : July 26, 1988

INVENTOR(S) : Lee J. Wanie et al

It is certified that error appears in the above-identified patent and that said Letters Patent is hereby corrected as shown below:

On the title page Inventors should read

--(75)Inventors: Lee J. Wanie; Robert N. Behrens; Stanley DeBraal

Michael Bedis --.

Signed and Sealed this

Fifth Day of June, 1990

Attest:

HARRY F. MANBECK, JR.

Attesting Officer

Commissioner of Patents and Trademarks